(12) United States Patent
Manabe et al.

(10) Patent No.: US 12,277,353 B2
(45) Date of Patent: Apr. 15, 2025

(54) CHANGING PRINTING SPEEDS IN AN IMAGE FORMING APPARATUS

(71) Applicant: CANON KABUSHIKI KAISHA, Tokyo (JP)

(72) Inventors: Koichiro Manabe, Kanagawa (JP); Yoshiji Kanamoto, Tokyo (JP); Kazuo Wakai, Tokyo (JP); Kosuke Tsujita, Tokyo (JP); Shogo Higashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/364,370

(22) Filed: Aug. 2, 2023

(65) Prior Publication Data

US 2024/0045627 A1 Feb. 8, 2024

(30) Foreign Application Priority Data

Aug. 5, 2022 (JP) .................... 2022-125850

(51) Int. Cl.
*G06F 3/12* (2006.01)
(52) U.S. Cl.
CPC .......... *G06F 3/1215* (2013.01); *G06F 3/1243* (2013.01)
(58) Field of Classification Search
CPC .............. G06F 3/1215; G06F 3/1243
See application file for complete search history.

(56) References Cited

U.S. PATENT DOCUMENTS

| | | | |
|---|---|---|---|
| 10,591,862 B1* | 3/2020 | Able | B41J 29/38 |
| 2011/0280643 A1* | 11/2011 | Matsumoto | G03G 15/234 400/582 |
| 2016/0188270 A1* | 6/2016 | Ito | G06F 3/1237 358/1.13 |
| 2020/0195797 A1* | 6/2020 | Kawano | H04N 1/00774 |

FOREIGN PATENT DOCUMENTS

JP 2019142163 A 8/2019

* cited by examiner

*Primary Examiner* — Eric A. Rust
(74) *Attorney, Agent, or Firm* — Canon U.S.A., Inc., IP Division

(57) ABSTRACT

A printing apparatus operable to perform printing based on print job data, the printing apparatus comprising a determination unit configured to determine a print speed for when the printing is performed, a switching unit configured to switch print speeds during the printing, and an analysis unit configured to analyze the print job data, wherein the analysis unit analyzes whether sheets that are print targets according to the print job data include a plurality of sheet types, and wherein the switching unit switches print speeds during the printing based on a productivity of printing for each sheet type when printing is performed for the sheets and a productivity of printing for a case where print speeds are switched by the switching unit.

10 Claims, 21 Drawing Sheets

FIG. 6

| 601 | 602 | 603 | 604 | 605 | 606 | 607 |
|---|---|---|---|---|---|---|
| ID | MEDIUM NAME | SIZE | TYPE | GRAMMAGE | PRINT SPEED 1 | PRINT SPEED 2 |
| ... | ... | ... | ... | ... | ... | ... |
| 010 | COATED PAPER A | A4 | DOUBLE-SIDE COATED PAPER | 200g | POSSIBLE | POSSIBLE |
| 011 | COATED PAPER B | A4 | DOUBLE-SIDE COATED PAPER | 200g | POSSIBLE | POSSIBLE |
| 012 | COATED PAPER C | A4 | SINGLE-SIDE COATED PAPER | 200g | POSSIBLE | POSSIBLE |
| ... | ... | ... | ... | ... | ... | ... |
| 020 | COATED PAPER X | A4 | DOUBLE-SIDE COATED PAPER | 200g | NOT POSSIBLE | POSSIBLE |
| ... | ... | ... | ... | ... | ... | ... |

600, 608, 609, 610, 611

| PAGE | SHEET ID | SHEET TYPE | |
|---|---|---|---|
| 1 | 011 | COATED PAPER B | |
| 2 | 011 | COATED PAPER B | |
| 3 | 011 | COATED PAPER B | |
| 4 | 011 | COATED PAPER B | 806 |
| ⋮ | ⋮ | ⋮ | |
| 99 | 012 | COATED PAPER C | 807 |
| 100 | 012 | COATED PAPER C | |
| 101 | 020 | COATED PAPER X | 808 |
| 102 | 020 | COATED PAPER X | |
| ⋮ | ⋮ | ⋮ | |
| 200 | 020 | COATED PAPER X | 808 |

FIG. 9

| Ready | | |
|---|---|---|
| Queues | Scheduled jobs(1 jobs, 1 selected) | 902 |
| | Job_A          200 pages, 1set, 2021-12-20 | |
| Printed jobs | | |
| DocBox | | |
| Copy/ scan | | |

| Schedule | Jobs | System | Admin |

| SHEET NO. | SHEET ID | SHEET TYPE | PRINT SPEED 1 | PRINT SPEED 2 | |
|---|---|---|---|---|---|
| 1 | 011 | COATED PAPER B | POSSIBLE | POSSIBLE | 1006 |
| 2 | 011 | COATED PAPER B | POSSIBLE | POSSIBLE | |
| 3 | 011 | COATED PAPER B | POSSIBLE | POSSIBLE | |
| 4 | 011 | COATED PAPER B | POSSIBLE | POSSIBLE | |
| ⋮ | ⋮ | ⋮ | ⋮ | ⋮ | |
| 99 | 012 | COATED PAPER C | POSSIBLE | POSSIBLE | 1007 |
| 100 | 012 | COATED PAPER C | POSSIBLE | POSSIBLE | |
| 101 | 020 | COATED PAPER X | NOT POSSIBLE | POSSIBLE | 1008 |
| 102 | 020 | COATED PAPER X | NOT POSSIBLE | POSSIBLE | |
| ⋮ | ⋮ | ⋮ | ⋮ | ⋮ | |
| 200 | 020 | COATED PAPER X | NOT POSSIBLE | POSSIBLE | 1008 |

F I G. 11A

| | |
|---|---|
| PRINT SHEET SIZE | A4 |
| PRINT SPEED 1 | 100(min) |
| PRINT SPEED 2 | 75(min) |
| SWITCHING TIME | 30 SEC |
| NUMBER OF JOB PAGES | 200 PAGES |
| JOB DATA | FIG. 8 |
| NUMBER OF PRINT SHEET | 200 SHEETS |

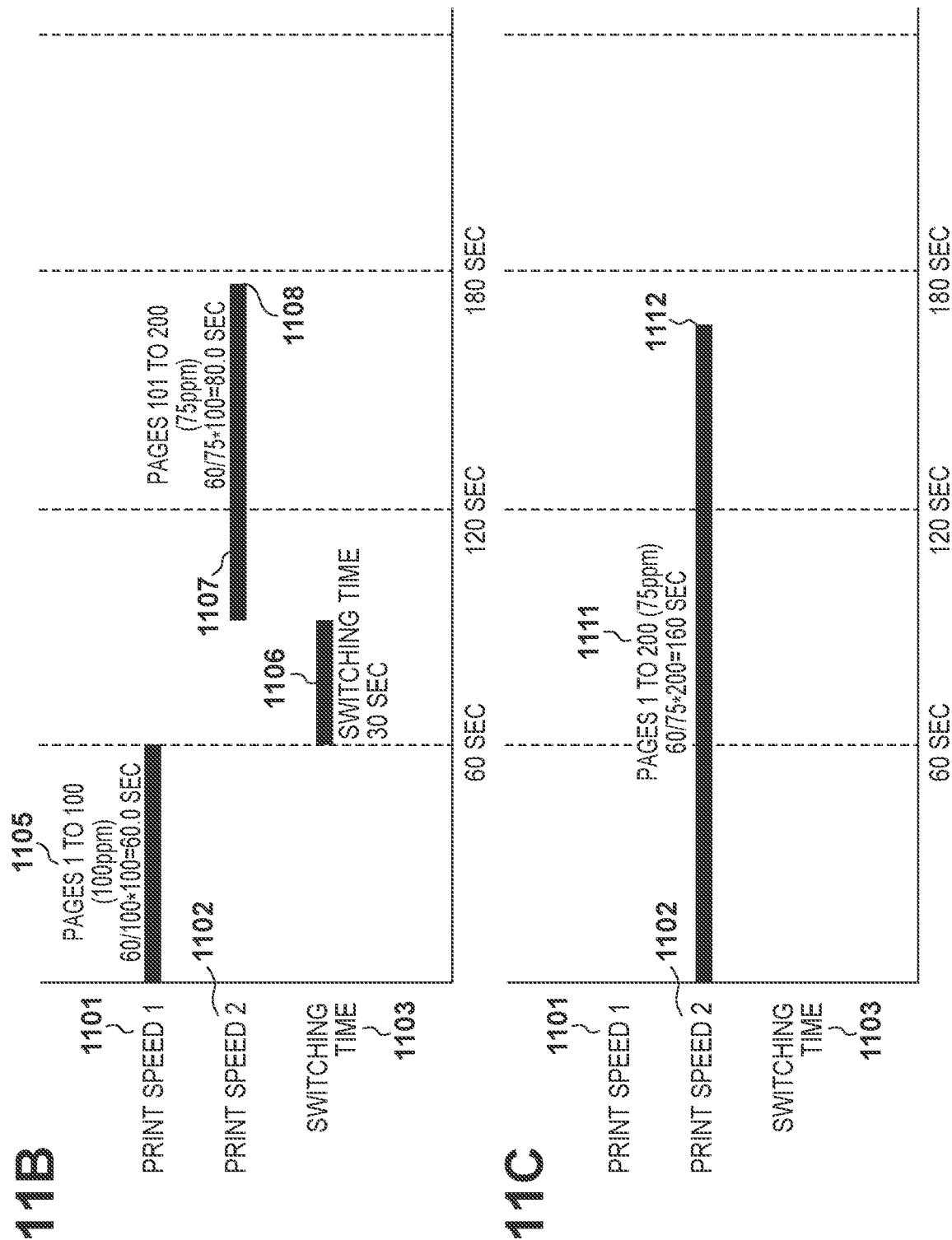

F I G. 12A

| | |
|---|---|
| PRINT SHEET SIZE | A3 |
| PRINT SPEED 1 | 50(min) |
| PRINT SPEED 2 | 32(min) |
| SWITCHING TIME | 30 SEC |
| NUMBER OF JOB PAGES | 200 PAGES |
| JOB DATA | FIG. 8 |
| NUMBER OF PRINT SHEET | 200 SHEETS |

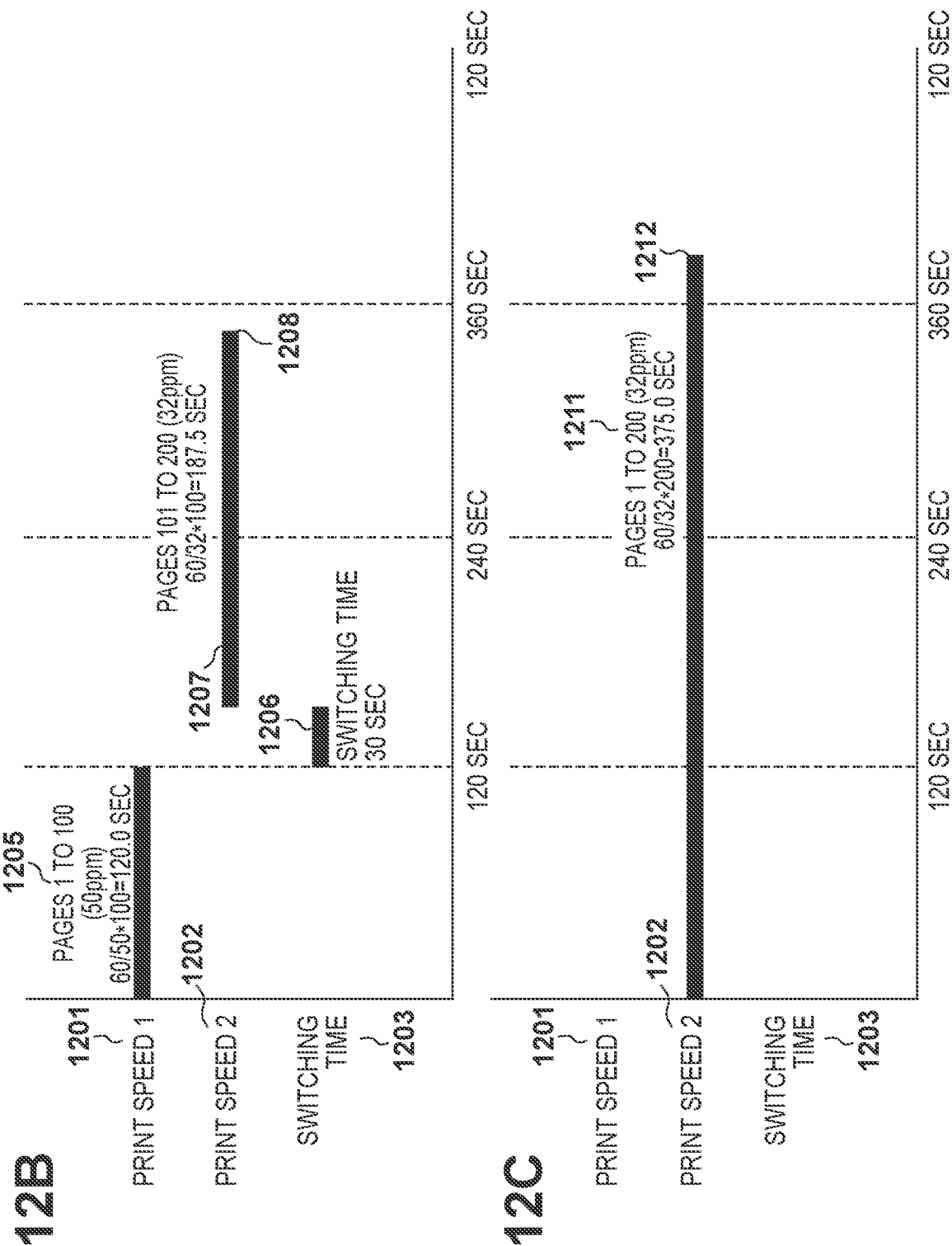

FIG. 14

| SHEET NO. 1401 | SHEET ID 1402 | SHEET TYPE 1403 | PRINT SPEED 1 1404 | PRINT SPEED 2 1405 | SINGLE/DOUBLE 1411 |
|---|---|---|---|---|---|
| 1 | 011 | COATED PAPER B | POSSIBLE | POSSIBLE | DOUBLE |
| 2 | 011 | COATED PAPER B | POSSIBLE | POSSIBLE | DOUBLE |
| 3 | 011 | COATED PAPER B | POSSIBLE | POSSIBLE | DOUBLE |
| 4 | 011 | COATED PAPER B | POSSIBLE | POSSIBLE | DOUBLE |
| ... | ... | ... | ... | ... | ... |
| 49 | 011 | COATED PAPER B | POSSIBLE | POSSIBLE | DOUBLE |
| 50 | 012 | COATED PAPER C | POSSIBLE | POSSIBLE | DOUBLE |
| 51 | 020 | COATED PAPER X | NOT POSSIBLE | POSSIBLE | DOUBLE |
| 52 | 020 | COATED PAPER X | NOT POSSIBLE | POSSIBLE | DOUBLE |
| ... | ... | ... | ... | ... | ... |
| 100 | 020 | COATED PAPER X | NOT POSSIBLE | POSSIBLE | DOUBLE |

FIG. 16A

| | |
|---|---|
| PRINT SPEED 1 | A4:100(min) |
| | A3:50(min) |
| PRINT SPEED 2 | A4:75(min) |
| | A3:32(min) |
| SWITCHING TIME | 30 SEC |
| NUMBER OF JOB PAGES | 200 PAGES |
| JOB DATA | FIG. 8 |
| NUMBER OF PRINT SHEET | 200 SHEETS |
| PRINT SHEET SIZE | 001-050 : A4 |
| | 051-100 : A3 |
| | 101-150 : A4 |
| | 151-200 : A3 |

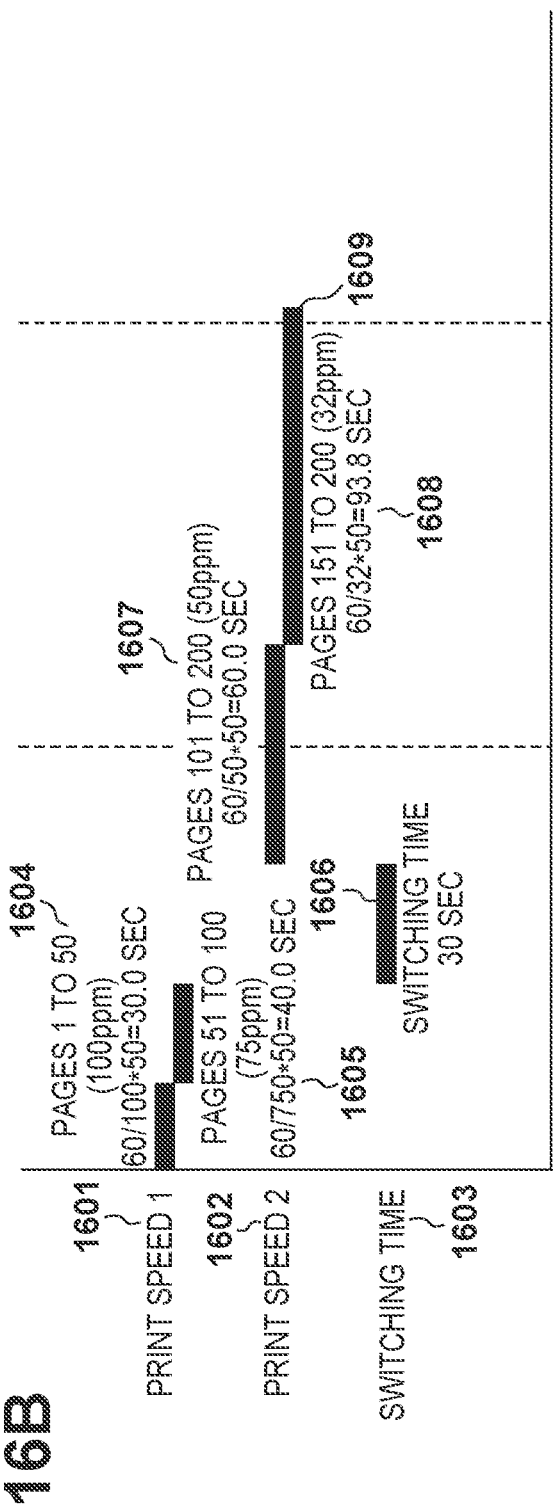
F I G. 16B
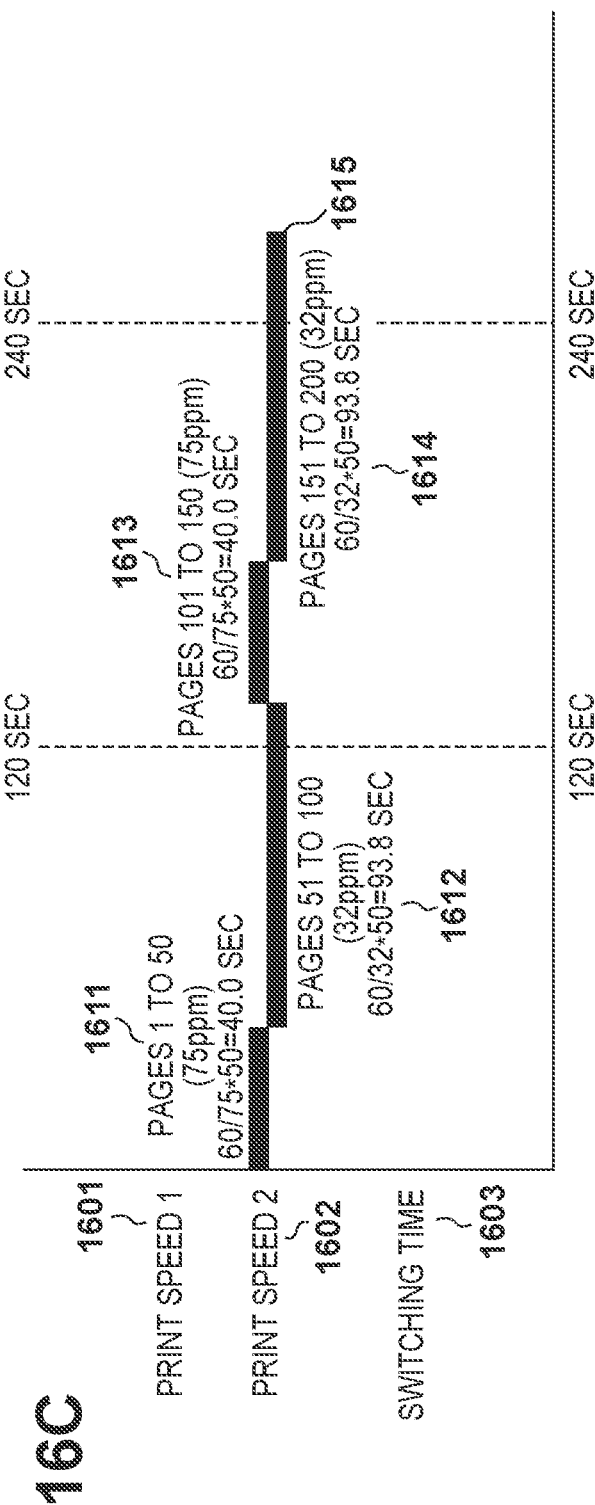
F I G. 16C

CHANGING PRINTING SPEEDS IN AN IMAGE FORMING APPARATUS

BACKGROUND

Field of the Disclosure

The present disclosure mainly relates to a printing apparatus.

Description of the Related Art

Among printers are multifunction peripherals (MFPs) that have a plurality of print speed modes; for example, in the case of plain paper, printing may be performed in high-speed printing mode, and in the case of special paper, printing may be performed in low-speed printing mode.

To further increase the number of functions of MFPs, configuration of print job data in which a plurality of sheet types is set as print target sheets is considered. Here, when the applicable print speed differs depending on the sheet type, time is wasted due to the print speed modes being switched, and so, the productivity of printing may decrease. Japanese Patent Laid-Open No. 2019-142163 describes a technique for switching the order of print jobs to maintain the productivity of printing but does not consider a print job in which a plurality of sheet types is mixed.

SUMMARY

The present disclosure has been made by the inventors in view of the above-described problems and maintains or improves the productivity of printing for print job data that can be processed at a plurality of print speeds.

One of the aspects of the present disclosure provides a printing apparatus operable to perform printing based on print job data, the printing apparatus comprising a determination unit configured to determine a print speed for when the printing is performed, a switching unit configured to switch print speeds during the printing, and an analysis unit configured to analyze the print job data, wherein the analysis unit analyzes whether sheets that are print targets according to the print job data include a plurality of sheet types, and wherein the switching unit switches print speeds during the printing based on a productivity of printing for each sheet type when printing is performed for the sheets and a productivity of printing for a case where print speeds are switched by the switching unit.

Further features of the present disclosure will become apparent from the following description of embodiments (with reference to the attached drawings).

BRIEF DESCRIPTION OF THE DRAWINGS

FIG. 6 is a diagram illustrating an example of media management information.

FIG. 9 is a diagram illustrating an example of a job management screen of the DFE.

FIG. 10 is a diagram illustrating an example of a result of job data analysis by the DFE.

FIGS. 11A, 11B, and 11C are diagrams illustrating an example of the effect according to whether print speed modes have been switched.

FIGS. 12A, 12B, and 12C are diagrams illustrating another example of the effect of whether print speed modes have been switched.

FIG. 14 is a diagram illustrating another example of a result of job data analysis by the DFE.

FIGS. 16A, 16B, and 16C are diagrams illustrating another example of the effect of whether print speed modes have been switched.

DESCRIPTION OF THE EMBODIMENTS

Figure 1:
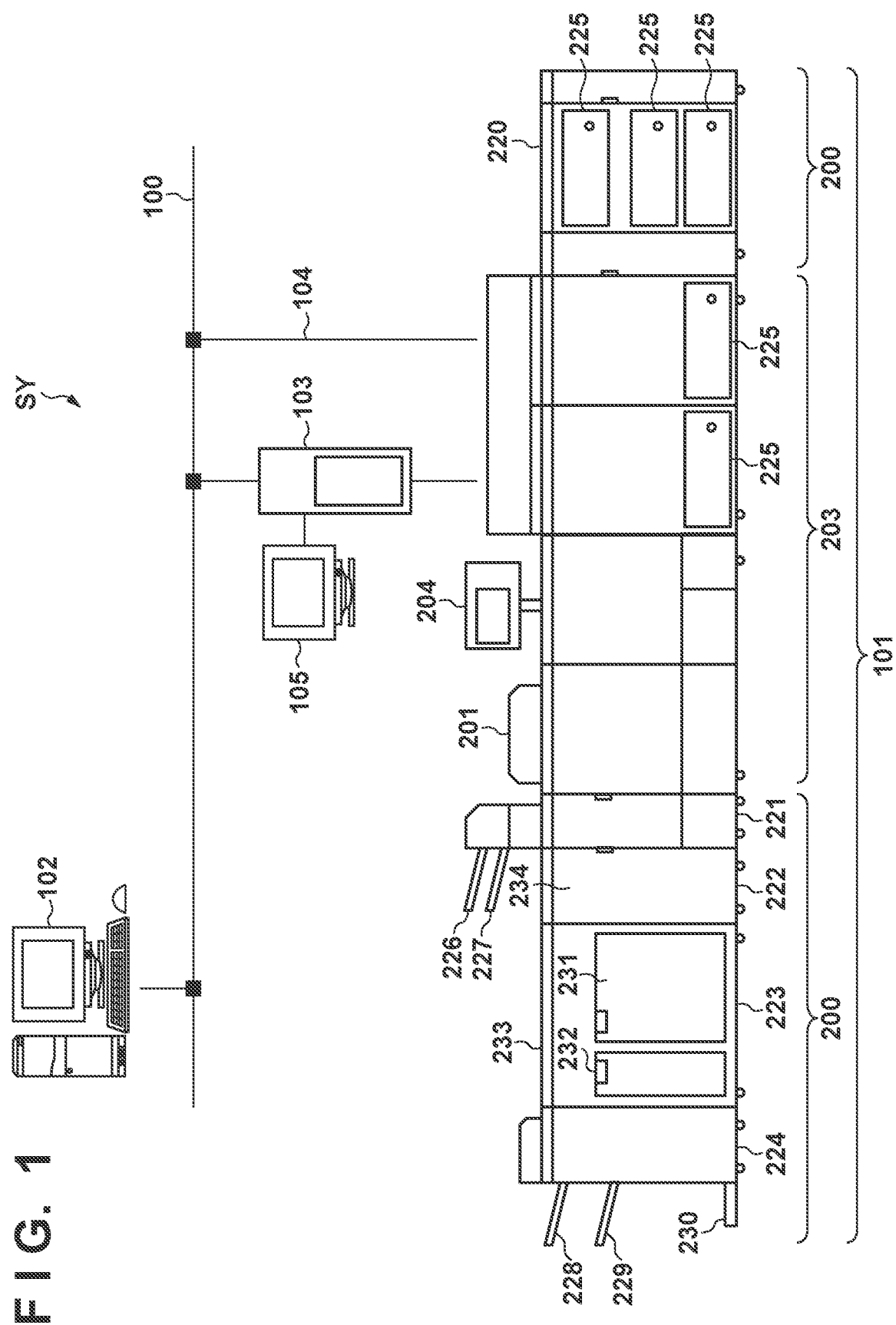
FIG. 1 is a block diagram illustrating an entire printing system according to an embodiment.

Hereinafter, embodiments will be described in detail with reference to the attached drawings. Note, the following embodiments are not intended to limit the scope of the claimed disclosure. Multiple features are described in the embodiments, but limitation is not made an disclosure that requires all such features, and multiple such features may be combined as appropriate. Furthermore, in the attached drawings, the same reference numerals are given to the same or similar configurations, and redundant description thereof is omitted.

First Embodiment

FIG. 1 illustrates an example of a print processing system SY according to a first embodiment. The print processing system SY includes a multifunction peripheral (MFP) 101 and a personal computer (PC) 102, which are connected so as to be able to communicate with each other via a network 100.

The MFP 101 is illustrated as an example of a printing apparatus or an image forming apparatus and, here, is assumed to include various functions, some of which may be omitted. Typical examples of the functions provided in the MFP 101 include a printing function for printing an image on a sheet, a reading function for reading an image on a sheet, and the like. Other examples include a post-processing function for binding a plurality of printed sheets or aligning and book-binding a plurality of printed sheets.

The sheets being referred to here need only be sheet-like materials that may be a target of the above functions, and the concept thereof may include paper materials, such as plain paper, thick paper, and coated paper, as well as non-paper materials, such as film and fabric. The sheets may also be expressed as "media".

The PC 102 is illustrated as an example of a computing apparatus, a signal processing apparatus, or an information processing apparatus, and the concept thereof may encompass a desktop or laptop computer as well as a portable terminal, such as a smartphone, a tablet terminal, or the like. The PC 102 is capable of executing various programs necessary for executing printing. Examples of the programs include an application program for generating a desired print job and transmitting the print job to the MFP 101. The PC 102 includes a function for converting print data into a printer language supported by the MFP 101 and various applications (e.g., a printer driver, workflow software, and the like) that provide such a function are installed therein. This makes it possible for a user to input a print instruction to the PC 102 and, based on that print instruction, print data generated by an application program to be converted into a format that can be processed by the MFP 101 and transmitted to the MFP 101 via the network 100. Although a single PC 102 is illustrated here, the number of PCs 102 may be two or more.

The print processing system SY may further include a digital front end (DFE) 103 and a monitor 105.

The DFE 103 mainly performs data processing for data of a print job (hereinafter referred to as print job data) inputted from the PC 102 to the MFP 101. Examples of data processing include correction, editing, RIP processing (processing for performing conversion to raster image), storage, management, or the like of data. The DFE 103 is capable of causing the monitor 105 to display necessary information and may include the monitor 105 as well as an apparatus capable of inputting and outputting necessary information. The MFP 101 may also be capable of directly connecting to the network 100 via a network cable 104. Some or all of the functions provided by the DFE 103 may be provided in the MFP 101, that is, a part of or all of the DFE 103 may be configured to be integrated into the MFP 101.

The MFP 101 includes a printer unit 203 for performing printing and a sheet processing unit 200 for performing sheet conveyance and associated processing.

The printer unit 203 forms an image by performing printing that is based on image data on a sheet or a medium fed from a paper feeding unit 225 using toner. Specifically, a light beam (e.g., a laser beam or the like) that has been modulated according to image data is reflected by a rotating polygon mirror (e.g., a polygon mirror or the like), and a photosensitive drum is irradiated with the reflected light serving as a scanning light. An electrostatic latent image thus formed on the photosensitive drum is developed using toner and transferred to a sheet adhered to a transfer drum. This series of operations is executed in order for toner of a plurality of colors, such as yellow (Y), magenta (M), cyan (C), and black (K), and color printing is thereby made possible. The sheet on the transfer drum on which a color image has thus been formed is conveyed to a predetermined fixer, and in the fixer, the toner on the sheet is fixed using a heat source, such as a halogen heater.

The printer unit 203 is capable of performing color printing as well as monochrome printing in which only black (K) toner is used.

Here, the DFE 103 is capable of selecting a print speed mode for when the above-described printer unit 203 executes a printing operation depending on the type of sheet to be printed (hereinafter, sheet type) and instructing the MFP 101. Here, since a print speed suitable for fixing processing may be limited depending on the sheet type, the grammage (weight per unit area), or the like, it is necessary to switch print speed modes depending on the sheet type, the grammage, or the like. Although details will be described later, since it takes a predetermined amount of time to switch print speed modes, the switching may cause the productivity of printed products to decrease.

The MFP 101 further includes a large-capacity paper feeding apparatus 220, an inserter 221, a punching apparatus 222, a bookbinding apparatus 223, and a processing apparatus 224.

The large-capacity paper feeding apparatus 220 may be mounted as a paper feeding apparatus capable of being attached to and detached from the printer unit 203. This makes it possible for the printer unit 203 to perform print processing for a large number of sheets.

The inserter 221 is used when inserting a sheet that is not a target of print processing (a sheet on which an image is not formed) into sheets printed by the printer unit 203. In the present embodiment, the inserter 221 includes two trays 226 and 227, and sheets may be inserted using these trays.

The punching apparatus 222 is capable of performing processing, such as punching processing, on a sheet conveyed from the printer unit 203 or the inserter 221. The punching apparatus 222 is provided with a door 234, and when a component, such as a die, within the punching apparatus 222, needs to be replaced, the user can access a replacement target by opening the door 234.

The bookbinding apparatus 223 is capable of performing bookbinding processing on a plurality of sheets conveyed from the printer unit 203 or the inserter 221. For example, a plurality of sheets can be made into a bookbinding product by binding sheets (punched sheets) on which processing has been performed by the punching apparatus 222 by threading a binding material through the holes. The bookbinding product thus generated is loaded on a tray provided behind a bookbinding door 231. In addition, the bookbinding apparatus 223 is provided with a door 232, and when replenishing a binding member, the user can open the door 232 and replenish the binding member. The bookbinding apparatus 223 is further provided with a door 233, and, for example, when a jam (paper jam) or the like occurs, the user can access a sheet that caused the jam or the like by opening the door 233.

The processing apparatus 224 is capable of performing staple binding processing on a plurality of sheets conveyed from the printer unit 203 or the inserter 221. Types of staple binding include corner binding, two-point binding, saddle bookbinding, and the like. A sheet bundle thus bound may be discharged to, for example, a tray 228 or 229 in the case of corner binding or two-point binding and a tray 230 in the case of saddle bookbinding.

In the present configuration, the MFP 101 can be divided into three sections. For example, the section positioned in the center in FIG. 1 is the printer unit 203 and is capable of performing the above-described printing operation.

The elements corresponding to the section on the right side of the printer unit 203 in the drawing correspond to a paper feeding system; the main function of the paper feeding system is to consecutively supply sheets to the printer unit 203 at an appropriate timing, and the paper feeding system is capable of additionally detecting the remaining amount of sheets. Paper feeding units 225 are arranged in the printer unit 203 and include the functions of the aforementioned paper feeding system, and here, these may be collectively referred to as a paper feeding system apparatus.

The elements corresponding to the section on the left side of the printer unit 203 in the drawing may be referred to as a sheet processing apparatus (or a post-processing apparatus). The sheet processing apparatus performs various kinds of processing on a printed sheet. The concept of this processing may also encompass accumulation of printed sheets. Here, a paper feeding system apparatus and the sheet processing apparatus are collectively referred to as the sheet processing unit 200; however, these may be distinguished from each other and expressed as a paper feeding system apparatus 200 and a sheet processing apparatus 200, respectively. These may be controlled by a controller unit 205 to be described later.

Figure 2:
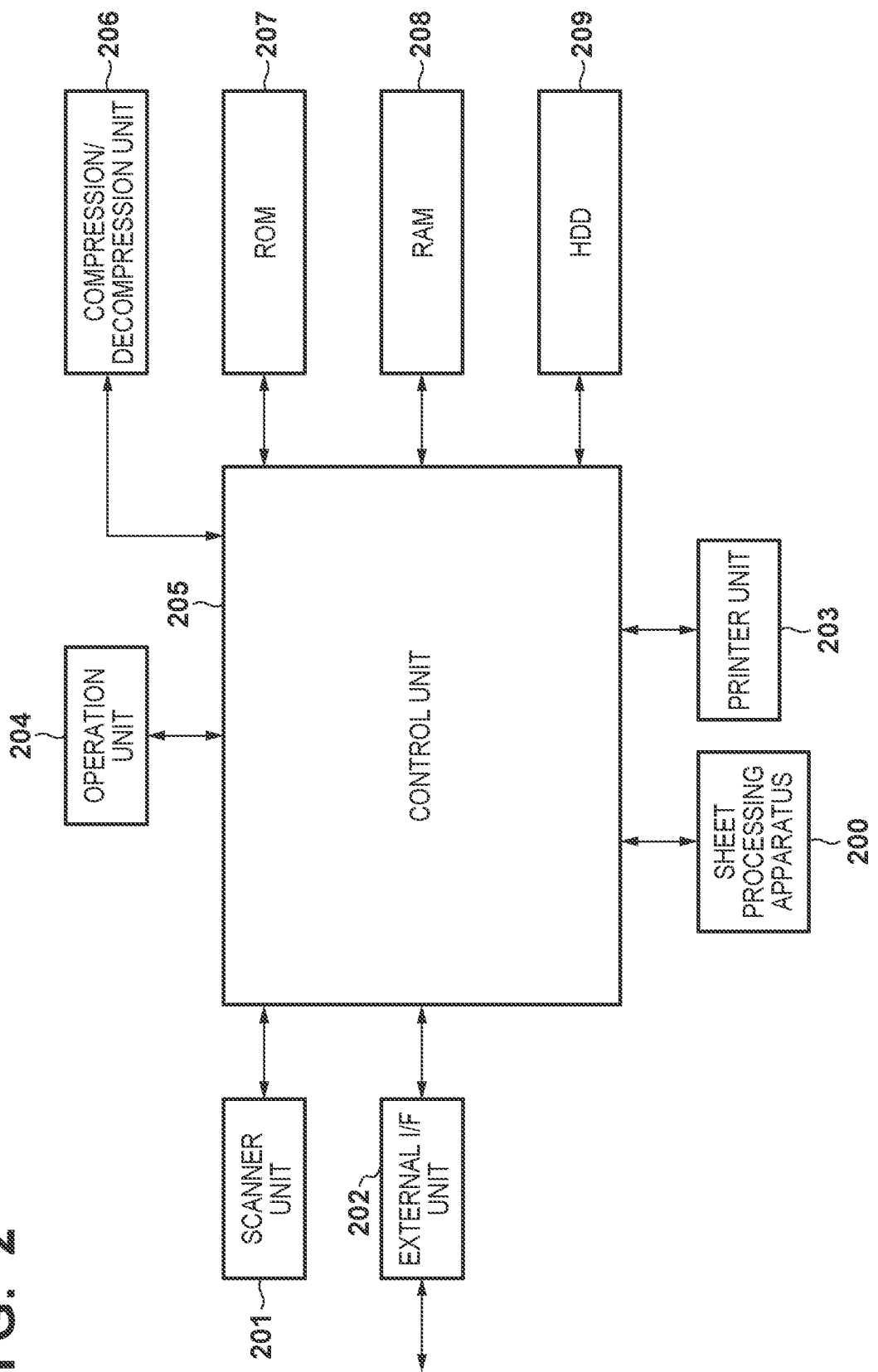
FIG. 2 is a diagram illustrating an example of a configuration of an MFP.

FIG. 2 is a block diagram illustrating an example of a configuration of the MFP 101. The MFP 101 may further include a scanner unit 201, an external interface (I/F) 202, an operation unit 204, the controller unit 205, and a compression/decompression unit 206. In addition, the MFP 101 may further include a read-only memory (ROM) 207, a random access memory (RAM) 208, and a hard disk drive (HDD) 209.

The scanner unit 201 reads an image from a document (a sheet on which an image has been formed), performs predetermined image processing on image data thereby obtained, and outputs the image data. This makes it possible for the MFP 101 to realize, as one of the printing functions, a so-called copying function, which is a function in which, after data received from the scanner unit 201 is stored in the HDD 209, the data is read out from the HDD 209 and printed by the printer unit 203.

The external I/F 202 allows image data to be transmitted to and received from a network-connected device, such as a facsimile, or an external apparatus. This makes it possible for the MFP 101 to perform printing, for example, by receiving job data from an external apparatus via the external I/F 202.

The operation unit 204 functions as a user interface unit for receiving operation inputs from the user. Typically, a touch panel display configured to be integrated into a display unit for displaying predetermined information to the user may be used as the operation unit 204.

The controller unit 205 includes a central processing unit (CPU) (not illustrated) and, although details will be described later, comprehensively controls processing, operation, and the like of various units provided in the MFP 101.

The ROM 207 is a read-only memory and stores various programs, such as a boot sequence and font information. The RAM 208 is a readable and writable memory and stores various data, such as image data which has been received from the scanner unit 201 or received from an external apparatus via the external I/F 202, and setting information.

For example, the ROM 207 stores various control programs including a program for executing processing, such as a flowchart to be described later. In addition, the ROM 207 also stores a display control program for causing the display unit of the operation unit 204 to display a user interface screen. These programs may be loaded to and executed on the RAM 208 by the controller unit 205, and various operations of the MFP 101 are thereby realized.

The ROM 207 also stores a program for decompressing page description language (hereinafter abbreviated as PDL) data received by the controller unit 205 from an external apparatus via the external I/F 202 into raster image data (bit map image data). Similarly, the ROM 207 also stores a program for processing a print job received by the controller unit 205 from an external apparatus. These can be processed by software.

The compression/decompression unit 206 is capable of compressing or decompressing (extending or expanding) image data stored in the RAM 208 or the HDD 209 into, for example, a JBIG, JPEG, and the like.

As described above, the HDD 209 is capable of storing various kinds of management information that needs to be stored continuously, changed, or managed in the MFP 101. For example, the HDD 209 is configured to be capable of holding a plurality of data, such as print data of a print job, and is capable of storing image data compressed by the compression/decompression unit 206. The HDD 209 is an example of a non-volatile storage apparatus capable of storing job data, and another storage apparatus may be used instead of the HDD 209.

In such a configuration, the controller unit 205 performs various kinds of data processing on data stored in the HDD 209. For example, the controller unit 205 stores the data of an inputted print job in the HDD 209 and also reads out the data from the HDD 209, outputs the data to the printer unit 203, and executes printing. In addition, the controller unit 205 is capable of transmitting the read job data to an external apparatus via the external I/F 202.

Figure 3:
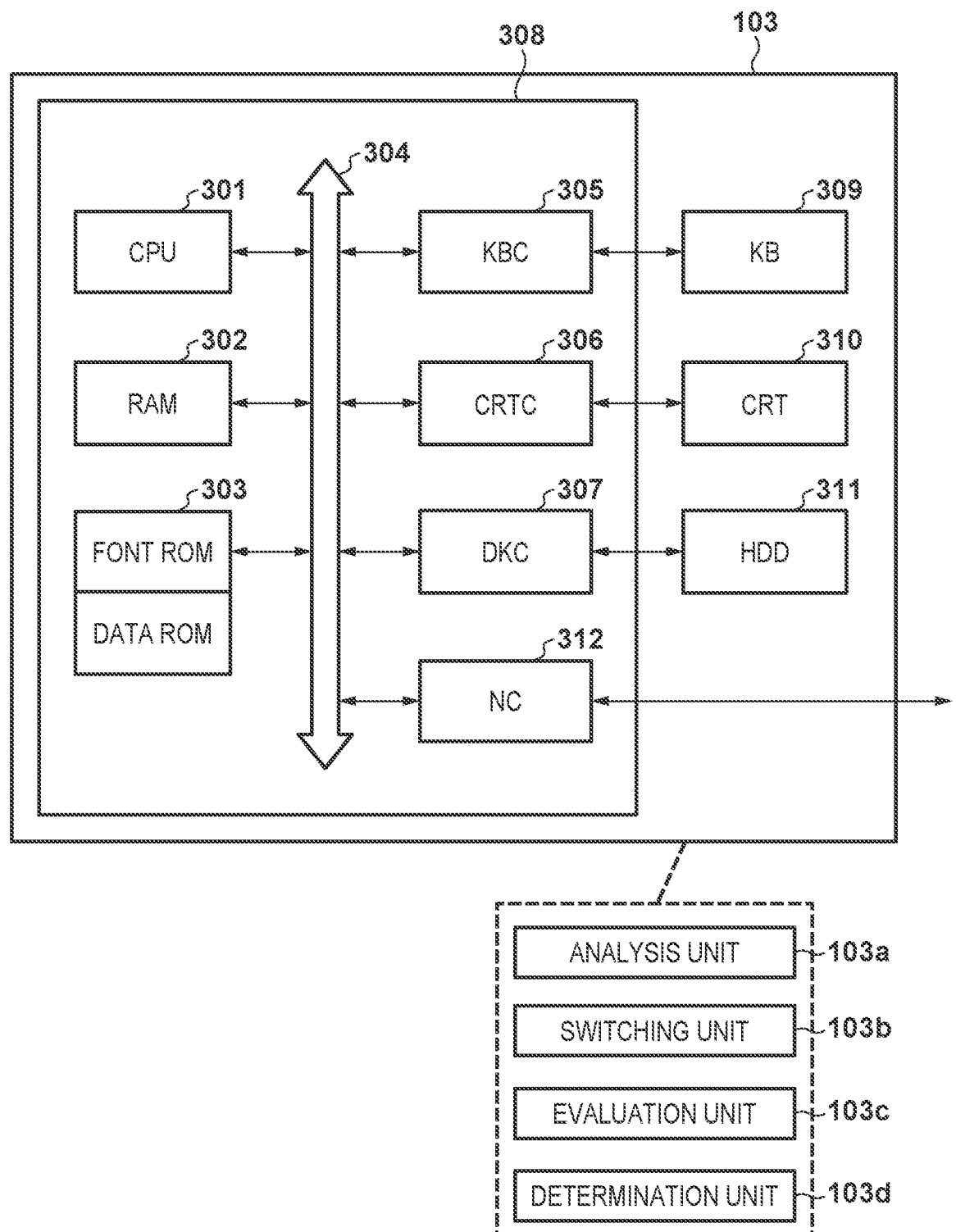
FIG. 3 is a diagram illustrating an example of a configuration of a DFE.

FIG. 3 is a block diagram illustrating an example of a configuration of the DFE 103. The DFE 103 includes a controller 308, a keyboard (KB) 309, a display unit (CRT) 310, and an HDD 311. The controller 308 includes a CPU 301, a RAM 302, a ROM 303, a keyboard controller (KBC) 305, a display controller (CRTC) 306, a disk controller (DKC) 307, and a network controller (NC) 312. These are connected to and are capable of communicating with each other via a bus 304 in the controller 308, and data signals and control signals can be transmitted and received.

The CPU 301 executes various programs, such as an operating system (OS) and application programs stored in the ROM 303 or read out from the HDD 311 to the RAM 302. The RAM 302 functions as a main memory or a work area of the CPU 301. The ROM 303 can be used as a font ROM or a data ROM.

The keyboard controller 305 performs control based on and according to an operation input to the keyboard 309 or an operation input from a pointing device (not illustrated). The display controller 306 performs display control for the display unit 310. The disk controller 307 performs access control for the HDD 311 for storing a boot program, application programs, font data, user files, and the like. The network controller 312 performs control for communication with another device connected to the network 100.

Figure 4:
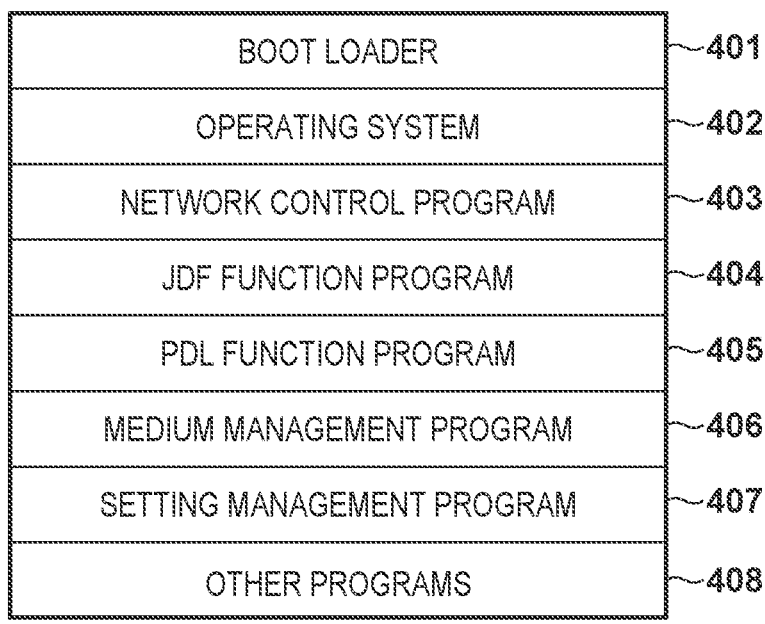
FIG. 4 is a diagram illustrating an example of a program of the MFP.

FIG. 4 illustrates an example of contents of programs of the MFP 101. These programs, as described above, are stored in the ROM 207 and may be read out and executed by the controller unit 205.

A bootloader 401 is a startup program to be executed immediately after a power source voltage is supplied to the MFP 101. This program may include a program for executing a startup sequence necessary for starting up a system of the MFP 101.

An operating system 402 is a program for providing an environment for executing various programs for realizing the functions of the MFP 101. That is, this program may provide functions, such as resource management of the memories (i.e., the ROM 207, the RAM 208 and the HDD 209) of the MFP 101 and input/output control of each component illustrated in FIG. 2.

A network control program 403 is a program to be executed when data is transmitted to and received from a device connected via the network 100. This program may include a device driver program for controlling the external I/F 202.

A job definition format (JDF) function program 404 is a JDF print function program that may be executed according to an instruction of the external I/F 202 when the MFP 101 receives JDF job data via the external I/F 202. This program describes data processing order and processing conditions. Based on this/these, the controller unit 205 sequentially performs driving control of respective device illustrated in FIG. 2, such as the sheet processing unit 200, the printer unit 203, the HDD 209, the compression/decompression unit 206, and the RAM 208 and may thereby execute JDF print processing. This program is a program for determining whether settings are appropriate for JDF by analyzing JDF job data received via the external I/F 202 and may further include a program for, when there is an inappropriate setting, performing a setting change for resolving the inappropriate setting.

A PDL function program 405 is a program for executing a printing function by performing PDL data decompression processing when the MFP 101 receives PDL data as image data to be printed via the external I/F 202. Similarly to the JDF function program 404, the controller unit 205 sequentially performs driving control of each device illustrated in FIG. 2 based on the processing order and processing conditions described in the program and may thereby realize the PDL function. This program may be configured to operate with the JDF function program 404 as a means for analyzing various job setting formats for when executing print processing.

A media management program 406 is a program for managing sheets that can be used by the MFP 101. This program can provide a media management function, such as registering new media and deleting unnecessary media, and also allows settings for registered media to be changed or unadjusted media to be adjusted and re-registered as adjusted media. The information managed by this program may be exported to or imported from outside the MFP 101, such as the PC 102, via the external I/F 202 as media information, and such a function may be provided in the MFP 101. The information managed by this program may also be managed in association with information indicating a compatible print speed mode for when printing. The information managed by this program may be stored in the HDD 209.

A setting management program 407 is a program for performing various settings in the MFP 101. An instruction for this program may be performed via the operation unit 204 but may also be remotely performed from an external system, such as the PC 102 and the DFE 103, via the external I/F 202.

It is assumed that, among programs for realizing the various functions of the MFP 101, other programs 408 are programs other than the above-described programs.

Figure 5:
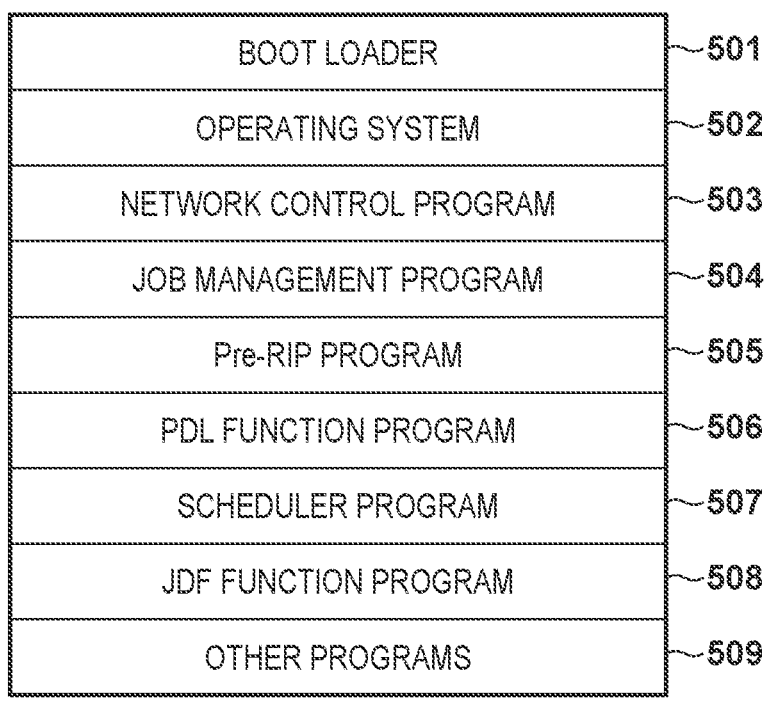
FIG. 5 is a diagram illustrating an example of a program of the DFE.

Similarly to FIG. 4, FIG. 5 illustrates an example of contents of programs of the DFE 103.

A bootloader 501 is a startup program to be executed immediately after a power source voltage is supplied to the DFE 103. This program may include a program for executing a startup sequence necessary for starting up a system of the DFE 103.

An operating system 502 is a program for providing an environment for executing various programs for realizing the functions of the DFE 103. That is, this program may provide functions, such as resource management of the memories (i.e., the ROM 303, the RAM 302 and the HDD 311) of the DFE 103.

A network control program 503 is a program to be executed when data is transmitted to and received from a device connected via the network 100 and may be used when transmitting print job data to the MFP 101 and instructing print processing. This program may also be used when, for example, receiving print data from or transmitting a status to an external apparatus, such as the PC 102.

A job management program 504 is a program for managing jobs that the DFE 103 has transmitted to the MFP 101. This program can manage a plurality of jobs in a job list in the order in which they have been transmitted and perform processing, such as switching the order of jobs, pausing and canceling jobs, and changing settings. When the DFE 103 receives a print job from an external apparatus, such as the PC 102, this program operates in cooperation with a PDL function program 506, a scheduler program 507, a pre-RIP program 505, and the like, which will be described later. This makes it possible to realize job management and job execution control in the DFE 103.

The pre-RIP program 505 is a program for analyzing a configuration of print job data when the DFE 103 receives a print job from the PC 102 via the network control program 503. For example, this program obtains the number of pages, page size, sheet information for each page, various kinds of setting information, and the like of print job data and transmits them so as to be used in the job management program 504.

The PDL function program 506 is a program for performing print job data decompression processing, which is executed when the DFE 103 receives a print job from the PC 102 via the network control program 503. The decompressed data is converted into a printable format and transmitted to the MFP 101 by the network control program 503, and the MFP 101 is thereby instructed to perform print processing.

The pre-RIP program 505 and the PDL function program 506 may be executed by the network control program 503 in cooperation with the media management program 406 (see FIG. 4), which is a program of the MFP 101. Although details will be described later, this makes it possible to determine the media type and the printing conditions used by a print job and select and control an appropriate print speed.

The scheduler program 507 is a program for indicating information of a progress status for each of the jobs registered in the job management program 504. This program causes the display unit 310 to display, for example, a time required for a job, a remaining time before the sheets run out, and the like, in chronological order. This makes it possible for the user to recognize time information related to a print job and thus appropriately supply sheets, plan generation of printed products, and the like.

A JDF function program 508 is a program for analyzing JDF job data when JDF job data is received from the PC 102 by the network controller 312. This program makes it possible to determine whether settings are appropriate for JDF by analyzing the received JDF job data and, when there is an inappropriate setting, perform a setting change for resolving the inappropriate setting.

It is assumed that, among programs included in the DFE 103, other programs 509 are programs other than the above-described programs.

FIG. 6 illustrates an example of a configuration of media management information 600, which includes a media database and associated information managed by the media management program 406 and stored in the HDD 209 (see FIG. 4). The information stored and managed in the media database can be referenced or edited from the DFE 103 via the network control program 503.

The media management information 600 includes a plurality of fields 601 to 607. The ID field 601 is a field indicating an internal ID determined in the MFP 101 for all media entries stored in the media database. The media name field 602, the media size field 603, the media type field 604, and the grammage field 605 are fields for managing media-related parameters in the media database.

The print speed 1 field 606 is a field indicating whether a high-speed printing mode (first print speed), which is one of a plurality of print speed modes provided by the MFP 101 in the present embodiment, is possible. The print speed 2 field 607 is a field indicating whether a low-speed printing mode (second print speed), which is another one of a plurality of print speed modes provided by the MFP 101 in the present embodiment, is possible. It is possible to reference information for each medium managed by the media database based on the information stored in the fields 606 and 607 and determine whether print processing can be performed at a corresponding print speed.

The information stored in the fields 606 and 607 may be statically provided by a provider or a manufacturer of the MFP 101 as unique information. Meanwhile, the information stored in the fields 606 and 607 may be edited or created by an operator of the MFP 101. The fields 606 and 607 may be configured to be capable of supporting both of these forms.

For the sake of descriptive simplicity, FIG. 6 illustrates four examples 608, 609, 610, and 611. The example 608 indicates that the media name is coated paper A, the media size is A4, the media type is double-side coated paper, the grammage is 200 g, the print speed 1 is possible, and the print speed 2 is possible. The example 609 indicates that the media name is coated paper B, the media size is A4, the media type is double-side coated paper, the grammage is 200 g, the print speed 1 is possible, and the print speed 2 is possible. The example 610 indicates that the media name is coated paper C, the media size is A4, the media type is single-side coated paper, the grammage is 200 g, the print speed 1 is possible, and the print speed 2 is possible. The example 611 indicates that the media name is coated paper X, the media size is A4, the media type is double-side coated paper, the grammage is 200 g, the print speed 1 is not possible, and the print speed 2 is possible. In the following description, the coated papers A, B, C and X corresponding to the examples 608, 609, 610 and 611 may be referred to as coated papers A 608, B 609, C 610 and X 611, respectively.

Although the coated papers A 608, B 609, C 610 and X 611 are mutually equivalent in their properties, in the present embodiment, they may be distinguished based on the print speed 1 field 606 and the print speed 2 field 607. That is, all of the coated papers A 608, B 609, C 610 and X 611 can be processed at the second print speed (in low-speed printing mode). Meanwhile, the first print speed (high-speed printing mode) is possible for the coated papers A 608, B 609 and C 610 and not possible for the coated paper X 611.

Although details will be described later, according to the present embodiment, it is possible to handle a print job, in which a plurality of media types that would have been regarded to be the same in the conventional MFP are mixed, in a sophisticated and flexible manner and execute the print job, while maintaining high productivity.

Figure 7A:
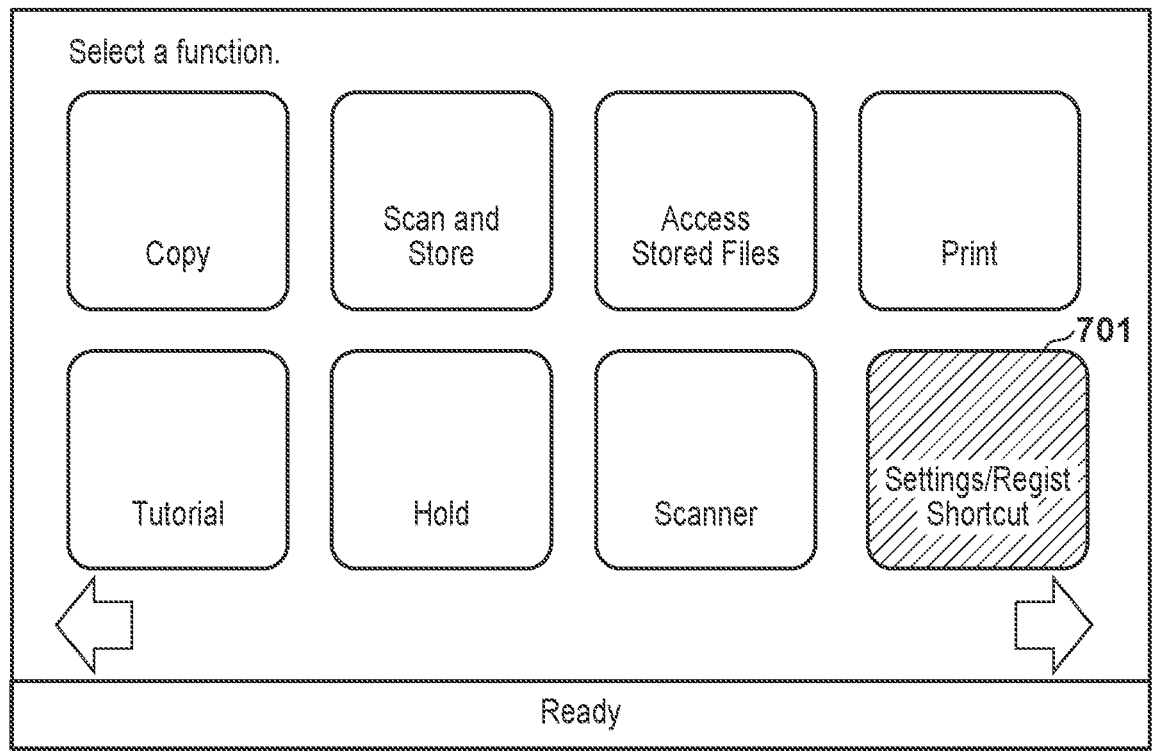
FIGS. 7A, 7B, and 7C are diagrams illustrating examples of operation screens for setting a print speed mode.
Figure 7B:
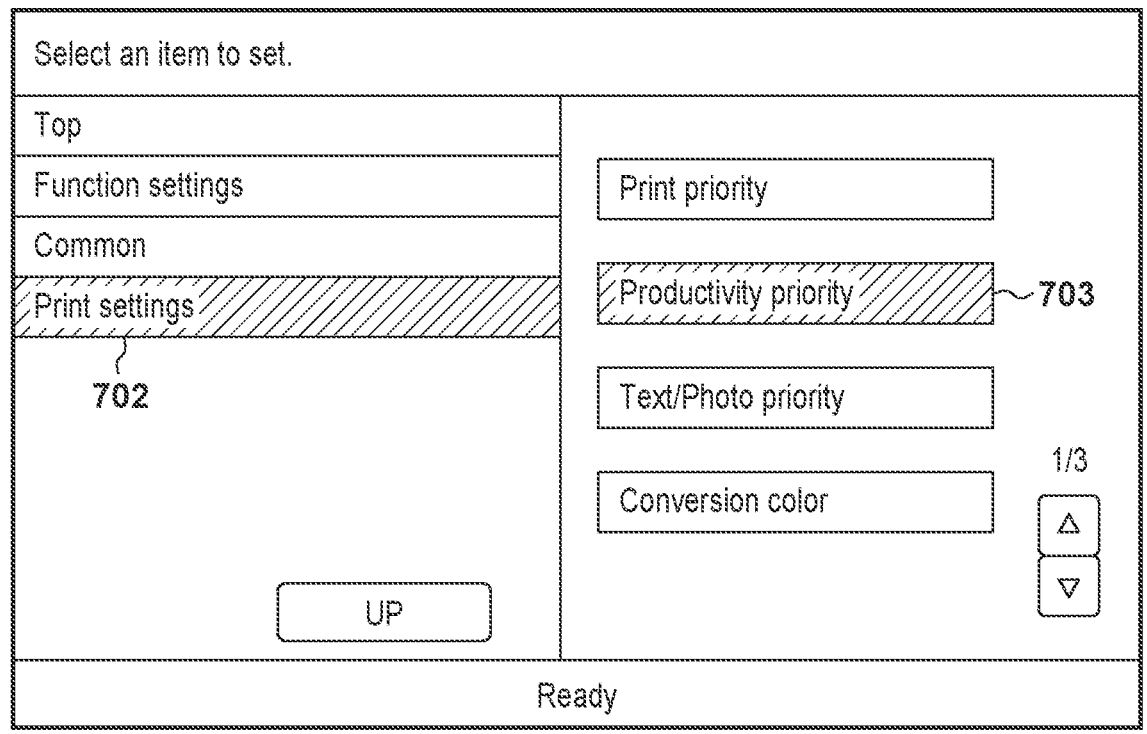
Figure 7C:
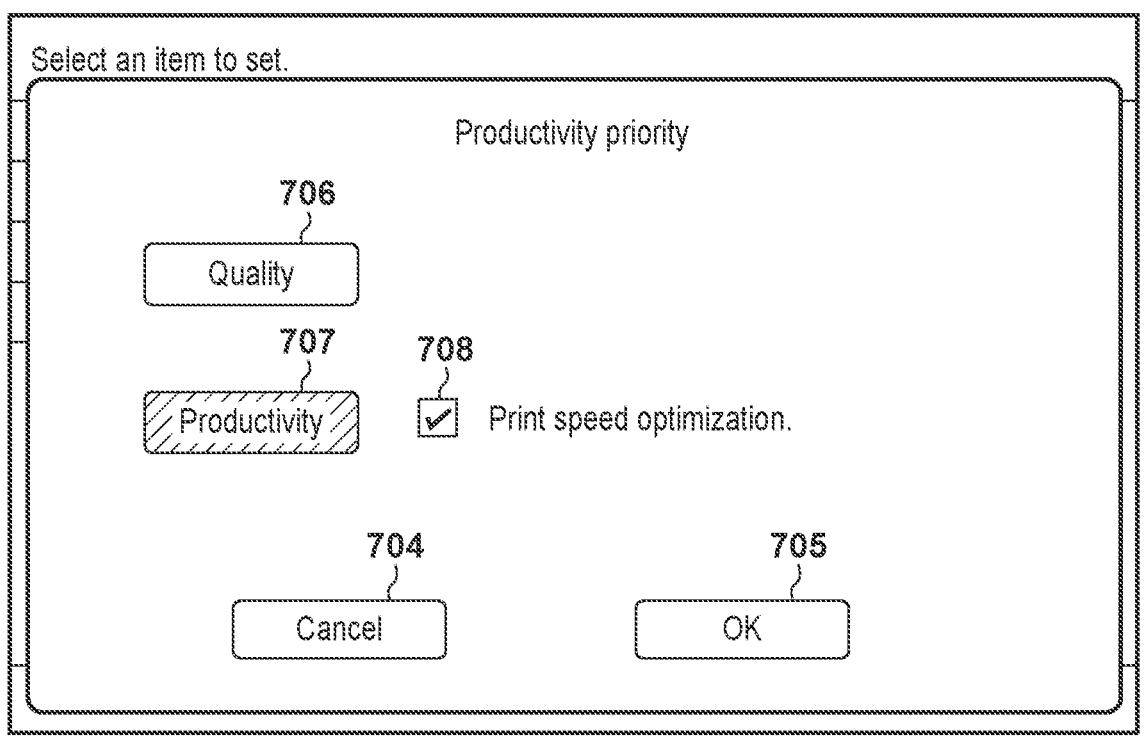

FIGS. 7A, 7B, and 7C illustrate examples of setting screens for setting a print speed mode using the operation unit 204 of the MFP 101.

FIG. 7A illustrates, as an example of a main screen, an example in which a setting unit 701, which is one of the functions provided in the MFP 101 is displayed. The setting unit 701 is provided in order to provide various default functions of the MFP 101 and a means for managing the default functions or a means for setting the default functions and may be used for instructing the setting management program 407 to be executed.

FIG. 7B illustrates, as an example of setting items provided by the setting unit 701 being selected in the state of FIG. 7A, an example of a state in which a print setting unit 702 has been selected. Although there may be a plurality of items in the print setting unit 702, here, it is assumed that a productivity setting unit 703 is displayed in a selectable manner.

FIG. 7C illustrates an example of a display screen provided by the productivity setting unit 703 being selected in the state of FIG. 7B.

A quality designation unit 706 is a means for selecting a print speed to be applied at the time of print processing and is a means for selecting and instructing the slowest print speed mode among one or more applicable print speed modes. A productivity designation unit 707 is a means for selecting a print speed to be applied at the time of print processing and is a means for selecting and instructing the fastest print speed mode among one or more applicable print speed modes. An optimization designation unit 708 is a setting means for instructing, in a state in which the productivity designation unit 707 has been selected, to automatically determine and apply an appropriate print speed mode when print speed modes need to be switched. The determination according to the optimization designation unit 708 is performed by a comparison between a decrease in productivity accompanying the occurrence of switching and an increase in productivity due to printing in high-speed printing mode.

In response to being pressed, an OK button 705 issues an instruction for accepting settings according to the various setting means illustrated in FIGS. 7A to 7C and storing the contents of the settings in the HDD 209. Meanwhile, in response to being pressed, a cancel button 704 issues an instruction for ending the setting operation without accepting settings according to the various setting means illustrated in FIGS. 7A to 7C or storing the contents of the settings in the HDD 209.

Here, the optimization designation unit 708 may be set in the DFE 103; however, when it is set in the MFP 101, the DFE 103 can obtain a setting value of the optimization designation unit 708 via the network controller 312 and the external I/F 202. When the optimization designation unit 708 is set, the DFE 103 performs the following control.

Upon receiving print job data from the PC 102 according to the network control program 503, the DFE 103 analyzes configuration information of the print job data according to the pre-RIP program 505. The number of pages, page size, sheet information for each page, various kinds of setting information, and the like of the print job data may thereby be obtained.

The DFE 103 converts print job data into a data format suitable for printing by performing print job data decompression processing according to the PDL function program 506, transmits the converted print job data to the MFP 101 according to the network control program 503, and thereby instructs the MFP 101 to execute print processing.

After receiving a print job, the MFP 101 decompresses the print job data and generates page image information or page image data to be a target of print processing. This may be performed by the controller unit 205 reading out and executing the PDL function program 405. At substantially the same time, sheet information to be used at the time of print execution may be determined based on a result of the decompression processing. The decompression processing is performed on the data constituting the job in order from the first page, and printable page image data may be stored in the HDD 209.

In the conventional MFP, print processing is executed promptly by the PDL function program 405 and the controller unit 205 for page image data stored in the HDD. At this time, the print speed mode to be applied at the time of printing execution is selected based on the speed information of the fields 606 and 607 in the media database (see FIG. 6) managed by the media management program 406.

However, when a plurality of sheet types is mixed and it is problematic to process the printing thereof at a single print speed, processing for switching print speed modes becomes necessary. As a result, at a boundary between pages of mixed sheet types, the production of printed matters is temporarily interrupted when the MFP 101 performs processing for switching print speed modes. Therefore, in the conventional MFP, at the time of print processing for when a plurality of sheet types is mixed, there is a possibility that the productivity will decrease due to the time required for the processing for switching print speed modes.

Here, even when the processing for switching print speed modes occur, the productivity does not uniformly decrease as compared with a case where print speed modes are prevented from switching and printing is executed in one print speed mode. For example, when there is a large number of sheets that can be printed in high-speed printing mode, a case where an increase in productivity due to printing in high-speed printing mode is larger than a decrease in productivity due to the time required for switch print speed modes is conceivable. Therefore, in order to more accurately suppress a decrease in productivity, it may be necessary to weigh a decrease (and a degree thereof) in productivity due to print speed modes being switched against an increase (and a degree thereof) in productivity according to the number of consecutive sheets that can printed in high-speed printing mode. As an example, by setting a condition for determining a print speed mode based on the number of sheets serving as a break-even point of the number of consecutive sheets that can be printed in high-speed printing mode, it is possible to more accurately suppress a decrease in productivity due to print speed modes being switched.

Meanwhile, the number of sheets serving as the break-even point of the number of consecutive sheets that can be printed in high-speed printing mode may vary depending on the condition. This is because while the decrease in productivity due to print speed modes being switched is uniform, the increase in productivity due to printing being performed in high-speed printing mode depends on a condition, such as a sheet size, for example. Therefore, in order to more accurately suppress a decrease in productivity, it is necessary to evaluate the increase in productivity according to the number of consecutive sheets that can be printed in high-speed print speed mode in comparison with a decrease in productivity due to print speed modes being switched, for example, in consideration of a condition, such as a sheet size.

In the present embodiment, the number of sheets serving as the break-even point of the decrease in productivity due to print speed modes being switched and the increase in productivity due to the number of consecutive sheets that can be printed in high-speed printing mode being printed is calculated based on a condition, such as a sheet size, for example. This makes it possible to suppress or prevent a decrease in productivity. To make this achievable, the DFE 103 executes the following operation when the optimization designation unit 708 is selected.

First, the DFE 103 receives print job data from the PC 102 according to the network control program 503. At that time, the DFE 103 analyzes various kinds of setting information, such as the number of pages of the print job and the sheet size (see steps S1301 and S1302 to be described later), by analyzing the configuration information of the print job data according to the pre-RIP program 505. Furthermore, the DFE 103 obtains sheet information for each sheet to be printed from the above-described media database (see FIG. 6) according to the media management program 406 based on the configuration information of the print job data. At that time, it is possible to determine a state of mixing of the setting contents of the fields 606 and 607 in the sheet type used for the print job data.

Here, it is determined whether the mode is for optimizing the print speed based on the setting value of the optimization designation unit 708 (see steps S1303 and S1304 to be described later). When the mode is for optimizing the print speed, a condition for determining an appropriate print speed mode is specified based on a print job setting, such as the sheet size of the print job data (see step S1305 to be described later). Then, the number of consecutive sheets that can be printed in high-speed printing mode is specified based on the configuration information of the print job data and the print speed setting content in the sheet type used for the print job data, thereby making it possible to determine an optimum print speed mode (see step S1306 to be described later). The DFE 103 can generate page data of the print job data according to the PDL function program 506 and instruct the MFP 101 to perform print processing according to the determined optimum print speed mode.

In the following, a form in which the quality designation unit 706, the productivity designation unit 707, and the optimization designation unit 708 have been selected will be described. Here, a case where a sheet that can be processed at the print speed 1 (high-speed printing) and a sheet that can be processed only at the print speed 2 (low-speed printing) are mixed in processing for printing pages included in a job is exemplified.

When the quality designation unit 706 is selected, even if there is a page that can be processed at the print speed 1, print processing according to the print speed 2 is performed for all of the sheets. This is because when the same sheet can be processed at a plurality of print speeds, it is generally advantageous to perform print processing at a lower speed to maintain the quality (e.g., glossiness, image uniformity). However, in this case, since even a sheet that can be processed at the print speed 1, which is, originally, high-speed printing, is processed at the print speed 2, which is low-speed printing, there is more emphasis on quality than productivity.

When the productivity designation unit 707 is selected, if there is a sheet that can be processed at the print speed 1, the sheet is processed according to the print speed 1 as much as possible. However, when a sheet that can be processed only at the print speed 2 is included in the job, the sheet is processed at the print speed 2 as printing at the print speed 1 is not possible. Therefore, the processing for switching the print speed 1 and the print speed 2 occurs; however, when most of the sheets to be printed according to the job can be processed according to the print speed 1, the productivity increases due to the print speed 1, which is high-speed printing.

When the optimization designation unit 708 is selected, unlike the productivity designation unit 707, print processing of the job is not immediately started, and whether printing is possible at the print speed 1 or only at the print speed 2 or a mixed state thereof is evaluated for a predetermined number of sheets at the beginning of the job. If any of the predetermined number of sheets can be processed at the print speed 1, it is predicted that it is highly likely that subsequent sheets can also be processed at the print speed 1.

Therefore, in this case, the print speed 1 is applied, and the print processing that had been interrupted is executed after the print speed is determined.

Meanwhile, when any of the predetermined number of sheets can be processed only at the print speed 2, it is predicted that it is highly likely that subsequent sheets can also be processed only at the print speed 2. Therefore, in this case, the print speed 2 is applied, and the print processing that had been interrupted is executed after the print speed is determined.

Furthermore, when a sheet that can be processed by the print speed 1 and a sheet that can be processed only by the print speed 2 are mixed in the predetermined number of sheets, if the print speed 1 or the print speed 2 is applied to each sheet at the time of print processing, the processing for switching print speeds will definitely occur. In this case, it is predicted that it is highly likely that the productivity will decrease due to the time for switching print speeds being generated. Therefore, for the effect of suppressing the processing for switching print speeds, the print speed 2 at which both sheets can be processed is uniformly applied, and control is performed so as to perform print processing on the sheets of the entire job.

More specifically, here, as described above, a sheet usage status is analyzed for the predetermined number of sheets at the beginning of the job, and print speeds are prevented from being switched by the print speed being determined based on a result of that analysis, thereby making it possible to prevent a decrease in productivity. In the present embodiment, it is determined whether print speeds will be switched based on the predetermined number of sheets at the beginning of the job, and an appropriate print speed is selected. This determination may be performed based on all of the sheets of the job, and this makes it possible to more appropriately prevent a decrease in productivity.

Here, even if the determination is made based on the predetermined number of sheets at the beginning of the jobs as in the present embodiment, generally, there is a tendency that different sheet types are designated toward the beginning of the job, and thus it is possible to prevent a decrease in productivity in many cases. Typical examples include a print product for which thick coated paper is used as a cover and plain paper is used for the body, that is, while the grammage is large and the paper is coated for the thick coated paper and thus the quality may be maintained by the print speed 2, the print speed 1 can be applied to plain paper. In such a case, the sheets are mixed at the beginning portion of the job for the cover and the body, and so, by analyzing the predetermined number of sheets at the beginning of the job (without analyzing all of the sheets of the job), it is possible to predict an outline of the print product. As a result, a decrease in productivity can be prevented by selecting an appropriate print speed by determining whether print speeds will be switched based on the predetermined number of sheets at the beginning of the job.

Next, as another example, a case where a series of data consisting of a plurality of records is executed as a single job—specifically, a case of a so-called variable print job data configured by pages of records consisting of a plurality of personal data being connected together—is considered. For example, when the beginning of records is preprinted paper and the body of the records is plain paper, it is considered that a plurality of records is included in a range of the predetermined number of sheets at the beginning. Also in this case, a decrease in productivity can be prevented by selecting an appropriate print speed by determining whether print speeds will be switched based on a result of analyzing the predetermined number of sheets at the beginning.

Figures 8A, 8B:
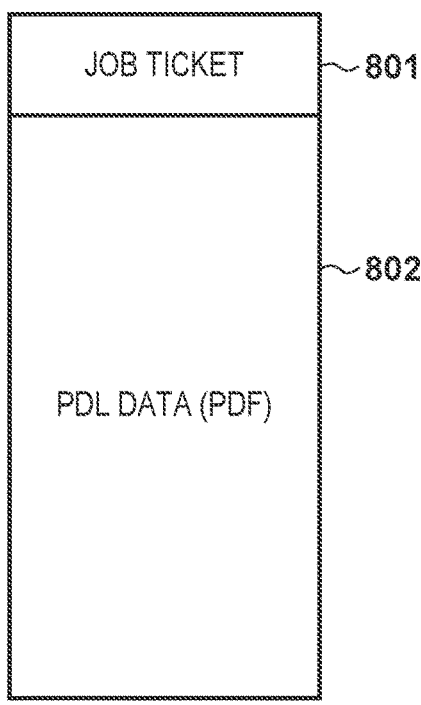
FIGS. 8A and 8B are diagrams illustrating an example of job data to be processed by the MFP.

FIGS. 8A and 8B illustrate an example of print job data illustrated for explaining the effect according to the present embodiment.

FIG. 8A illustrates an example of an overall configuration of print job data. The illustrated data is created by various application programs in the PC 102 or the like for processing according to the PDL function program 405 and, here, is assumed to include a job ticket portion 801 and a PDL data portion 802. The job ticket portion 801 is a data portion in which print settings are stored and may include, for example, setting information to be applied to the entire job and settings for post-processing, image processing, and the like. The PDL data portion 802 is a data portion in a PDF format and may store image information constituting a page and various print control commands.

In this example, it is assumed that the setting information of the media used in printing is obtained at the time of printing each page by decompressing the PDL data portion 802; however, as another example, the setting information may be designated in the job ticket portion 801.

FIG. 8B illustrates an example of media information for each page that may be stored in the PDL data portion 802 and obtained by decompression. The media information can be obtained by analyzing the PDL data portion 802.

A page field 803 is a field indicating a page number in the job data. A sheet ID field 804 and a sheet type field 805 are fields that are used when printing page data indicated in the page field 803 and store sheet information corresponding to the page number.

Based on the media information, the DFE 103 sets a sheet for each of the pages constituting the job and executes a print instruction to the MFP 101. In response to this, the MFP 101 selects one of the paper feeding units 225 (see FIG. 1) and causes it to feed a corresponding sheet.

In the example of FIG. 8B, a plurality of sheet types is set in a mixed manner; for example, in settings 806 for the first to 98th pages, the sheet ID is "011" and the sheet type is "coated paper B." Similarly, in settings 807 for the 99th to 100th pages, the sheet ID is "012" and the sheet type is "coated paper C", and in settings 808 for the 101st to 200th pages, the sheet ID is "020" and the sheet type is "coated paper X".

FIG. 9 illustrates, as an example of a job management screen that can be displayed on the monitor 105 (or the display unit 310), a state in which Job_A 902 is registered to the DFE 103 in a state in which a job management screen selection unit 901 is selected. Job_A 902 is executed by a print job being transmitted from the PC 102 to the DFE 103 and the DFE 103 accepting the print job (see FIG. 1). When the DFE 103 receives the job data, the job data is executed for the MFP 101 after the aforementioned determination of the print speed mode by the DFE 103.

FIG. 10 illustrates an example of data content of each page/sheet for job data generated and managed by the DFE 103 when determining the print speed to be applied to the execution of the printing of Job_A 902, similarly to FIG. 8B.

A sheet ID field 1002 and a sheet type field 1003 indicate the media information of respective sheets to be printed for the job data indicated by a sheet field 1001. In addition, for each sheet, whether processing at the print speed 1 (high-speed printing mode) and the print speed 2 (low-speed printing mode) as print speed modes in the MFP 101 is possible is indicated by a print speed 1 field 1004 and a print speed 2 field 1005, respectively. Here, for the sake of descriptive simplicity, a case of single-sided printing is considered; however, information indicating either single-sided printing or double-sided printing may be optionally indicated by another field.

Settings 1006 to 1008 in the drawing correspond to the settings 806 to 808 in FIG. 8B, respectively. That is, for the first to 100th sheets, the fields 1004 and 1005 both indicate "possible", and for the 101st to 200th sheets, the field 1004 indicates "not possible" and the field 1005 indicates "possible".

According to the example of FIG. 10, all of the first to 200 pages can be printed in low-speed printing mode at the print speed 2. Meanwhile, while for the first to 100th pages print processing in high-speed printing mode at the print speed 1 is possible, the 101st to 200th pages need to be printed in low-speed printing mode at the print speed 2. Therefore, the time required for switching print speed modes is added as a print processing time or a time required for printing. Here, according to the processing to be described later, it is possible to compare a decrease in productivity due to the time required for switching being generated with an increase in productivity due to printing being executed in high-speed printing mode, and based on the result, it is possible to determine a print speed mode advantageous for increasing productivity.

FIGS. 11A to 11C illustrate the content of print processing in the MFP 101 for when single-sided printing is performed on the above-described print job.

FIG. 11A illustrates printing conditions in the present example. Here, the size of a sheet to be printed is "A4". In addition, among the print speed modes that can be executed by the MFP 101, the print speed 1, which is the high-speed printing mode, is set to 100 pages per minute (PPM, the number of pages that can be printed per minute). Similarly, the print speed 2, which is the low-speed printing mode, is set to 75 PPM. The time required for switching the print speed 1 and the print speed 2 is set to 30 seconds. The total number of pages of the job data illustrated in FIGS. 8A to 8B is set to 200 pages, that is, the number of sheets to be printed is 200 sheets.

FIG. 11B is a timing chart for explaining the time required for print processing in a case where print speeds are switched, and FIG. 11C is a timing chart for explaining the time required for print processing in a case where print speeds are not switched. The vertical axes in the drawings indicate the print speed 1 as a parameter 1101, the print speed 2 as a parameter 1102, the time for switching the print speed 1 and print speed 2 as a parameter 1103, and the horizontal axes indicate the cumulative time that they require.

As described above, in this example, the first to 100th sheets can be printed at the print speed 1 of the high-speed printing mode, that is, at 100 PPM; therefore, in the example of FIG. 11B, a required time 1105 therefor is 60 seconds. Meanwhile, the 101st to 200th sheets can be printed only at the print speed 2 of the low-speed printing mode, that is, at 75 PPM; therefore, the print speed modes are switched, requiring 30 seconds as a time required for switching 1106 and 80 seconds for a time required for subsequent printing 1107. As a result, a cumulative time until completion of printing 1108 is 170 seconds.

In contrast, in the example of FIG. 11C, the switching of print speed modes is suppressed, thereby suppressing the generation of required time, that is, all of the sheets are printed at the print speed 2 of the low-speed printing mode, and a required time 1111 is 160 seconds. As a result, a cumulative time 1112 until completion of printing is 160 seconds.

Therefore, in the job data of the present example, the cumulative time 1112 for when the switching of print speed modes is suppressed is 10 seconds shorter than the cumulative time 1108 for when the print speed modes are switched. That is, when the switching of print speed modes is suppressed, the productivity of printing (or printed products) increases.

FIGS. 12A to 12C illustrate another example in which single-sided printing is performed for the above-described print job, similarly to FIGS. 11A to 11C. The printing conditions illustrated in FIG. 12A are different from the example of FIG. 11A in that the sheet size is "A3"; the print speed 1, which is the high-speed printing mode, is 50 PPM; and the print speed 2, which is the low-speed printing mode, is 32 PPM. Parameters 1201 to 1203 illustrated in FIGS. 12B and 12C correspond to the above-described parameters 1101 to 1103, respectively. In addition, times 1205 to 1208, 1211 and 1212 illustrated in FIGS. 12B and 12C correspond to the above-described times 1105 to 1108, 1111, and 1112, respectively.

In this case, in the example of FIG. 12B, it takes 120 seconds as the required time 1205 for the print speed 1 of the high-speed printing mode, 30 seconds as the required time 1206 for switching print speed modes, and 187.5 seconds as the required time 1207 for the print speed 2 of the low-speed printing mode. As a result, the cumulative time 1208 until completion of printing is 337.5 seconds.

Meanwhile, in the example of FIG. 12C, the required time 1211 for the print speed 2 in the low-speed printing mode is 375 seconds. As a result, the cumulative time 1212 until completion of printing is 375 seconds.

Therefore, in the job data of the present example, the cumulative time 1208 for when the print speed modes are switched is 37.5 seconds shorter than the cumulative time 1212 for when the switching of print speed modes is suppressed. That is, when the print speed modes are switched, the productivity of printing increases.

In summary, whether the productivity increases due to the print speed modes being switched or not switched may change depending on the conditions of the print job, because the increase in productivity due to the number of pages that can be printed at the print speed 1 of the high-speed printing mode changes depending on the conditions of the print job. Therefore, it is necessary to determine whether to switch print speed modes by calculating the break-even point of the decrease in productivity due to print speed modes being switched and the increase in productivity due to the number of consecutive pages that can be printed in high-speed printing mode. These are advantageous for, when it is necessary to switch from the high-speed printing mode to the low-speed printing mode during printing, determining which print speed mode to start the printing by weighing it against, for example, when printing is completed in the low-speed printing mode from the start of the printing.

Figure 13A:
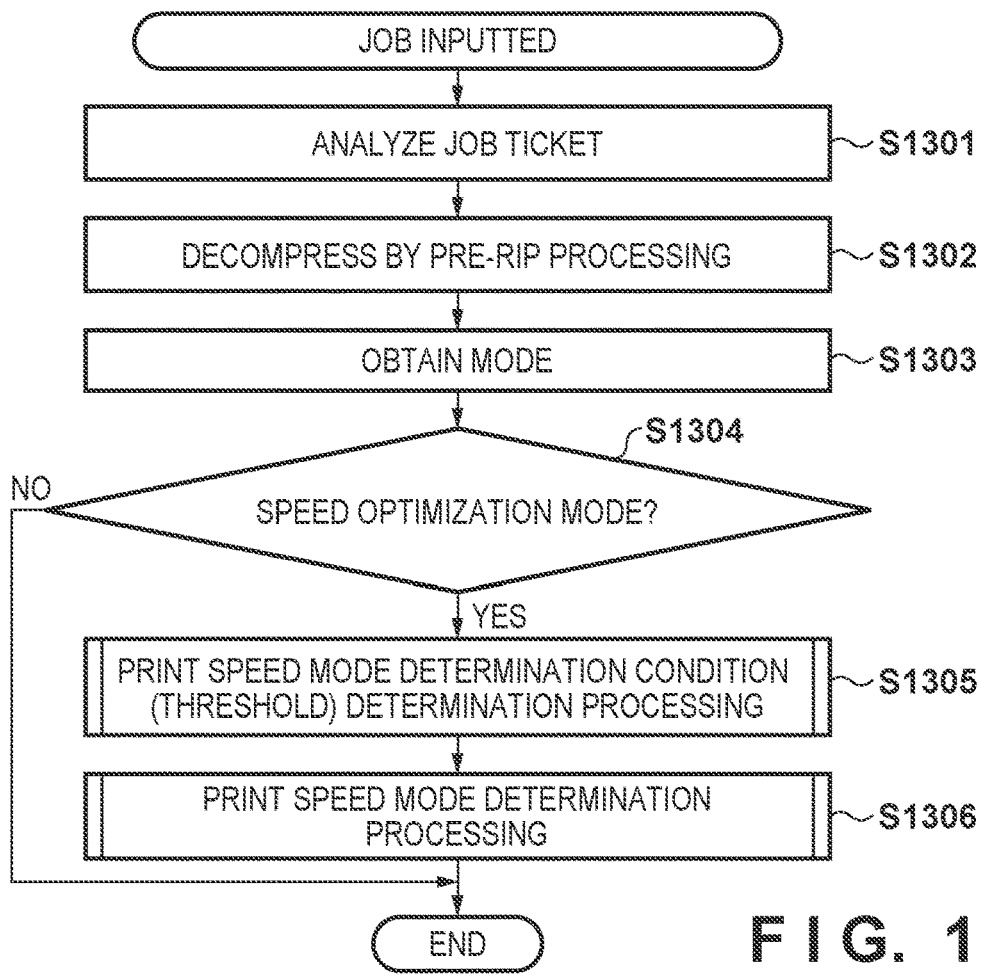
FIGS. 13A, 13B, and 13C are flowcharts for explaining examples of a method of determining a print speed mode by the DFE.

FIG. 13A illustrates a flowchart for explaining a method of determining whether to perform the above-described switching of print speed modes.

In step S1301 (hereinafter simply indicated as S1301; it is similar for other steps to be described later), upon receiving print job data, the DFE 103 analyzes the job ticket 801 according to the JDF function program 508.

In S1302, the DFE 103 decompresses the print job data by performing pre-RIP processing according to the pre-RIP program 505 and thereby analyzes the configuration information thereof and analyzes various kinds of setting information, such as the number of pages and the sheet size of the print job. At this time, the media database managed by the media management program 406 is referenced and an applicable print speed mode is obtained by the network control program 503 and the job management program 504. This makes it possible to manage information as to whether printing can be performed at the print speed 1 (high-speed printing mode) and the print speed 2 (low-speed printing mode) according to the fields 1004 and 1005.

The DFE 103 obtains a setting value of the optimization designation unit 708 according to the network control program 503 in S1303 and determines whether the mode is for optimizing the print speed in S1304. When the optimization designation unit 708 is not set (when it is determined NO in S1304), the flowchart ends. When the optimization designation unit 708 is set (when it is determined YES in S1304), the processing proceeds to S1305, and the DFE 103 performs print speed mode determination condition specification processing illustrated in FIG. 13B.

Figure 13B:
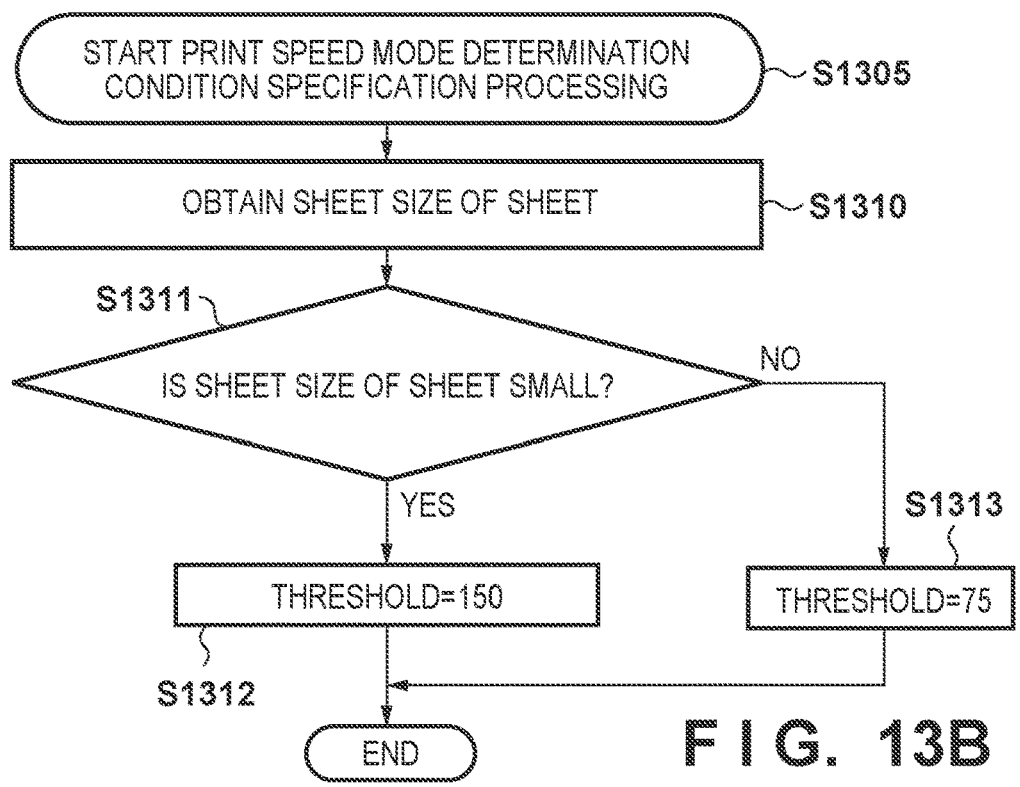

As illustrated in FIG. 13B, the DFE 103 obtains a sheet size of the job data in S1310 and determines the sheet size of the sheet in S1311. When the sheet size is a small size (when it is determined YES in S1311), the DFE 103 sets a parameter THRESHOLD for a print speed mode determination condition to 150 in S1312 and then returns to the flowchart of FIG. 13A. When the sheet size is not a small size (when it is determined NO in S1311), the DFE 103 sets the parameter THRESHOLD to 75 in S1313 and then returns to the flowchart of FIG. 13A.

Figure 13C:
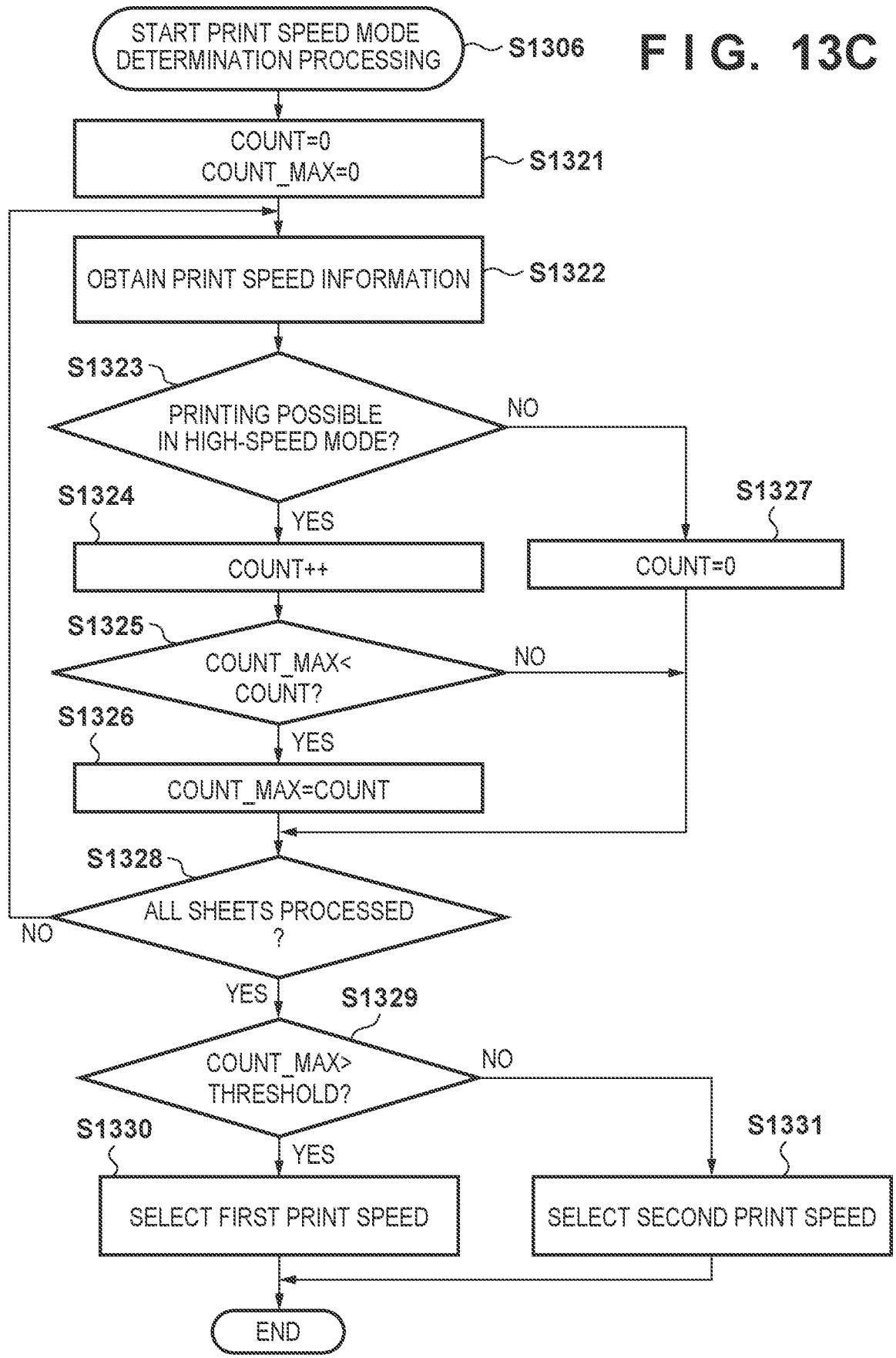

In S1306, the DFE 103 performs print speed mode determination processing illustrated in FIG. 13C.

As illustrated in FIG. 13C, in S1321, the DFE 103 initializes the number of consecutive sheets that can be printed in high-speed printing mode in the job data as a parameter COUNT (COUNT=0). Along with this, the maximum number of consecutive sheets that can be printed in high-speed printing mode is initialized as a parameter COUNT_MAX (COUNT_MAX=0). S1322 to S1328 after S1321 indicate processing contents for each sheet in the job data.

In S1322, information indicating whether the processing at the print speeds 1 and 2 is possible is obtained as the print speed information from the fields 1004 and 1005 of the job data of FIG. 10, and in S1323, whether the printing in high-speed printing mode is possible is determined.

When the page to be processed can be printed in high-speed printing mode (when it is determined YES in S1323), the processing proceeds to S1324, and 1 is added to the parameter COUNT (COUNT=COUNT+1).

In S1325, it is determined whether the parameter COUNT is greater than the parameter COUNT_MAX (COUNT_MAX<COUNT). When COUNT_MAX<COUNT (when it is determined YES in S1325), the processing proceeds to S1326, and the parameter COUNT_MAX is updated with the parameter COUNT, and thereby the number of consecutive sheets that can be printed in high-speed printing mode is defined by COUNT_MAX. Meanwhile, when COUNT_MAX≥COUNT (when it is determined NO in S1325), the processing proceeds to S1328.

When the page to be processed cannot be printed in high-speed printing mode (when it is determined NO in S1323), the processing proceeds to S1327, and the parameter COUNT is set to 0 (COUNT=0).

In S1328, it is determined whether all of the print target sheets of the job data have been processed. When there is an unprocessed page (when it is determined NO in S1328), the processing contents of the above-described S1322 to S1327 is repeated in order for each of the unprocessed pages.

When all of the print target sheets of the job data have been processed (when it is determined YES in S1328), in S1329, the DFE 103 determines whether the parameter COUNT_MAX is greater than the parameter THRESHOLD (COUNT_MAX>THRESHOLD).

When COUNT_MAX>THRESHOLD (when it is determined YES in S1329), in S1330, the high-speed printing mode (first print speed) is selected as the print speed of this job, and this flowchart is terminated. That is, the DFE 103 determines that the degree of increase in productivity due to the number of consecutive sheets that can be printed in high-speed printing mode is greater (is more effective) than the degree of decrease in productivity due to print speed modes being switched.

Meanwhile, when COUNT_MAX≤THRESHOLD (when it is determined NO in S1329), in S1331, the switching of print speed modes is suppressed by the low-speed printing mode (second print speed) being selected as the print speed of this job, and this flowchart is terminated. That is, the DFE 103 determines that the degree of decrease in productivity due to print speed modes being switched is greater (has a greater effect) than the degree of increase in productivity due to the number of consecutive sheets that can be printed in high-speed printing mode.

With the above processing, in the case of the print job data illustrated in FIG. 11A, the parameter THRESHOLD indicating the print speed mode determination condition is 150, and the parameter COUNT_MAX indicating the maximum number of consecutive sheets that can be printed in high-speed printing mode is 100. In this case, in S1329, it may be determined that the productivity increases by printing in the low-speed printing mode (second print speed) (FIG. 11C). Meanwhile, in the case of the print job data illustrated in FIG. 12A, the parameter THRESHOLD indicating the print speed mode determination condition is 75, and the parameter COUNT_MAX indicating the maximum number of consecutive sheets that can be printed in high-speed printing mode is 100. In this case, in S1329, it may be determined that the productivity increases by printing in the high-speed printing mode (first print speed) (FIG. 12B).

According to the present embodiment, as illustrated in S1306 and S1307, the print speed mode switching determination condition is made variable based on the size information of the print target sheet of the print job. This makes it possible to appropriately determine the print speed mode for increasing the productivity of printing in consideration of the time required for switching print speed modes.

With the above aspect, it is said that the DFE 103 functions as elements 103a to 103d as shown in FIG. 3. An analysis unit 103a analyses the print job data. A switching unit 103b switches the print speeds during the printing. An evaluation unit 103c evaluates the productivity of printing, based on (i) the degree of increase in productivity of printing for a case where printing is performed at the first print speed and (ii) the degree of decrease in productivity of printing for a case where print speeds are switched by the switching unit 103b. A determination unit 103d determines, based on the evaluation result, the print speed for when the printing is performed. Note that at least part of these functions of DFE 103 (and their related functions) may be included in MFP 101.

Second Embodiment

In the above-described first embodiment, a form in which, for a case where printing of each page of a print job is performed by single-sided printing on each sheet, the print speed mode switching determination condition is made variable based on the size information of the print target sheet of the print job has been illustrated. In the following, a case of double-sided printing will be described as a second embodiment. When respective pages are printed on both sides of the sheet for a print job having the configuration illustrated in FIG. 8B, the print job data is configured as illustrated in FIG. 14.

In FIG. 14, when compared to FIG. 10 for a case of single-sided printing, fields 1401 to 1405 correspond to the fields 1001 to 1005, respectively, and settings 1406 to 1408 correspond to the settings 1006 to 1008, respectively.

According to FIG. 14, that double-sided printing is to be performed for the target sheet is further set in a single/double-sided printing field 1411, that is, two pages of information will be printed on each sheet. Therefore, a 200-page print job consists of a total of 100 sheets of information as illustrated in the sheet information 1401.

Figure 15:
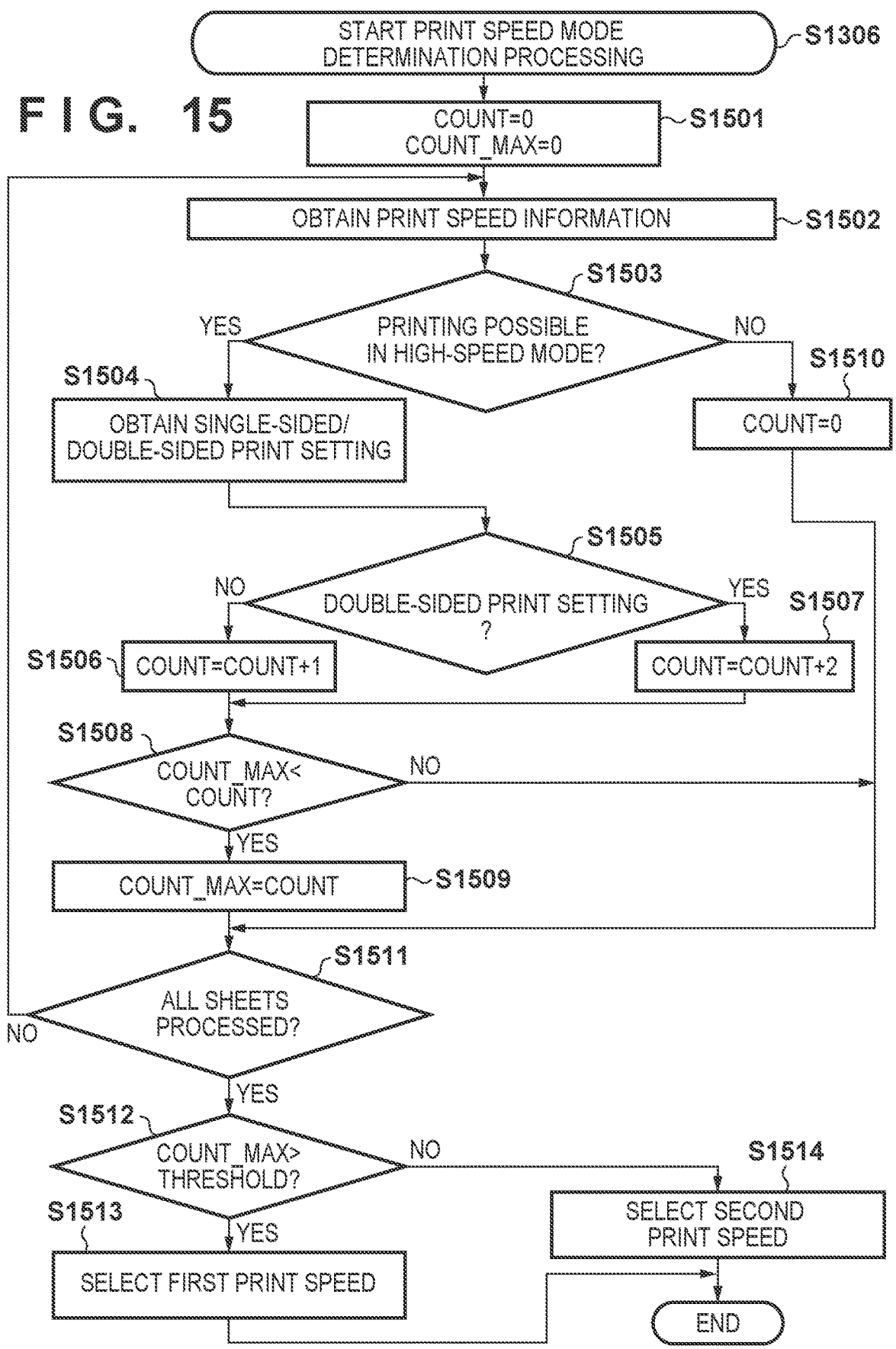
FIG. 15 is a flowchart for explaining another example of a method of determining a print speed mode.

FIG. 15 illustrates a flowchart of print speed mode determination processing according to the present embodiment for S1306 (see FIG. 13A) as part of a method of determining whether to switch print speed modes for the print job in this case.

In S1501, the parameter COUNT and the parameter COUNT_MAX (COUNT=0, COUNT_MAX=0) are initialized, similarly to S1321. S1502 to S1509 after S1501 indicate processing contents for each sheet in the job data.

In S1502, information indicating whether the processing at the print speeds 1 and 2 is possible is obtained as the print speed information from the fields 1404 and 1405 of the job data of FIG. 14, similarly to S1322, and in S1503, whether the printing in high-speed printing mode is possible is determined, similarly to S1323.

When the page to be processed can be printed in high-speed printing mode (when it is determined YES in S1503), the processing proceeds to S1504, and the setting of the single/double-sided printing field 1411 is obtained, and thereby, in S1505, it is determined whether the page is set to double-sided printing.

When the sheet to be processed is not set to double-sided printing (when it is determined NO in S1505), the processing proceeds to S1506, and 1 is added to the parameter COUNT (COUNT=COUNT+1). Meanwhile, when the sheet to be processed is set to double-sided printing (when it is determined YES in S1505), the processing proceeds to S1507, and 2 is added to the parameter COUNT (COUNT=COUNT+2). By this, it is possible to express the number of sides of the sheet to be processed in single-sided print setting and double-sided print setting by the parameter COUNT.

In S1508, it is determined whether the parameter COUNT is greater than the parameter COUNT_MAX (COUNT_MAX<COUNT), similarly to S1325. When COUNT_MAX<COUNT (when YES is determined in S1508), the processing proceeds to S1509, and the parameter COUNT_MAX is updated with the parameter COUNT. Meanwhile, when COUNT_MAX≥COUNT (when NO is determined in S1508), the processing proceeds to S1511.

When the page to be processed cannot be printed in high-speed printing mode (when NO is determined in S1503), the processing proceeds to S1510, and the parameter COUNT is set to 0 (COUNT=0), similarly to S1327.

In S1511, it is determined whether all of the print target sheets of the job data have been processed, similarly to S1328. When there is an unprocessed page (when NO is determined in S1511), the processing contents of the above-described S1502 to S1510 is repeated in order for each of the unprocessed pages.

When all of the print target sheets of the job data have been processed (when YES is determined in S1511), in S1512, the DFE 103 determines whether the parameter COUNT_MAX is greater than the parameter THRESHOLD (COUNT_MAX>THRESHOLD), similarly to S1329.

Here, when COUNT_MAX>THRESHOLD (when YES is determined in S1512), in S1513, the high-speed printing mode (first print speed) is selected, similarly to S1330, and this flowchart is terminated. That is, the DFE 103 determines that the degree of increase in productivity due to the number of consecutive sheets that can be printed in high-speed printing mode is greater (is more effective) than the degree of decrease in productivity due to print speed modes being switched.

Meanwhile, when COUNT_MAX≤THRESHOLD (when NO is determined in S1512), in S1514, the switching of print speed modes is suppressed by selecting the low-speed printing mode (second print speed), similarly to S1331, and this flowchart is terminated. That is, the DFE 103 determines that the degree of decrease in productivity due to print speed modes being switched is greater (has a greater effect) than the degree of increase in productivity due to the number of consecutive sheets that can be printed in high-speed printing mode.

According to the present embodiment, even when single-sided printing and double-sided printing are mixed in a print job, it is possible to appropriately determine the print speed mode for increasing the productivity of printing, and an effect similar to that of the above-described first embodiment can be obtained.

Third Embodiment

In the above-described first and second embodiments, cases where print targets of respective pages of the print job are sheets of the same size have been described; however, as a third embodiment, the print speed mode switching determination condition may be variable depending on whether the sheet size is a large size or a small size.

FIGS. 16A to 16C illustrate an example of a print job in which a plurality of sheet sizes is mixed, similarly to FIGS. 11A to 11C or FIGS. 12A to 12C.

Regarding the printing conditions illustrated in FIG. 16A, for the sheet sizes of "A4" and "A3", the print speed 1, which is the high-speed printing mode, is 100 PPM and 50 PPM, respectively, and the print speed 2, which is the low-speed printing mode, is 75 PPM and 32 PPM, respectively. Further, the first to 50th pages are an A4 size, the 51st to 100th pages are an A3 size, the 101st to 150th pages are an A4 size, and the 151st to 200th pages are an A3 size. The other items are similar to those of FIG. 11A or FIG. 12A.

Here, for the first to 100th pages, the print processing can be performed by either the print speed 1 (high-speed printing mode) or the print speed 2 (low-speed printing mode). Meanwhile, for 101st to 200th pages, the print processing at the print speed 1 is not possible, and the print processing at the print speed 2 is possible.

Parameters 1601 to 1603 illustrated in FIGS. 16B and 16C correspond to the above-described parameters 1101 to 1103 (or 1201 to 1203), respectively.

A time 1604 illustrated in FIG. 16B indicates a time required for the print speed 1 for the first to 50th pages, which are an A4 size, and is 30 seconds in this example. A time 1605 indicates a time required for the print speed 1 for the 51st to 100th pages, which are an A3 size, and is 40 seconds in this example. A time 1606 indicates a time required for switching print speed modes and is 30 seconds in this example. A time 1607 indicates a time required for the print speed 2 for the 101st to 150th pages, which are an A4 size, and is 60 seconds in this example. A time 1608 indicates a time required for the print speed 2 for the 151st to 200th pages, which are an A3 size, and is 93.8 seconds in this example. In addition, a time 1609 indicates a cumulative time of the times 1604 to 1608 and is 253.8 seconds in this example.

A time 1611 illustrated in FIG. 16C indicates a time required for the print speed 2 for the first to 50th pages, which are an A4 size, and is 40 seconds in this example. A time 1612 indicates a time required for the print speed 2 for the 51st to 100th pages, which are an A3 size, and is 93.8 seconds in this example. A time 1613 indicates a time required for the print speed 2 for the 101st to 150th pages, which are an A4 size, and is 40 seconds in this example. A time 1614 indicates a time required for the print speed 2 for the 151st to 200th pages, which are an A3 size, and is 93.8 seconds in this example. In addition, a time 1615 indicates a cumulative time of the times 1611 to 1614 and is 267.6 seconds in this example.

Therefore, in the job data of the present example, the cumulative time 1609 for when the print speed modes are switched is 13.8 seconds shorter than the cumulative time 1615 for when the switching of print speed modes is suppressed. That is, when the print speed modes are switched, the productivity of printing increases.

In summary, when a plurality of sheet sizes is mixed in the print job data, the print speed mode to be designated may change compared to the first embodiment in which a plurality of sheet sizes is not mixed. Therefore, it can be said that it is necessary to determine whether the print speed modes need to be switched in order to increase the productivity according to a state of mixing of sheet sizes.

Figure 17:
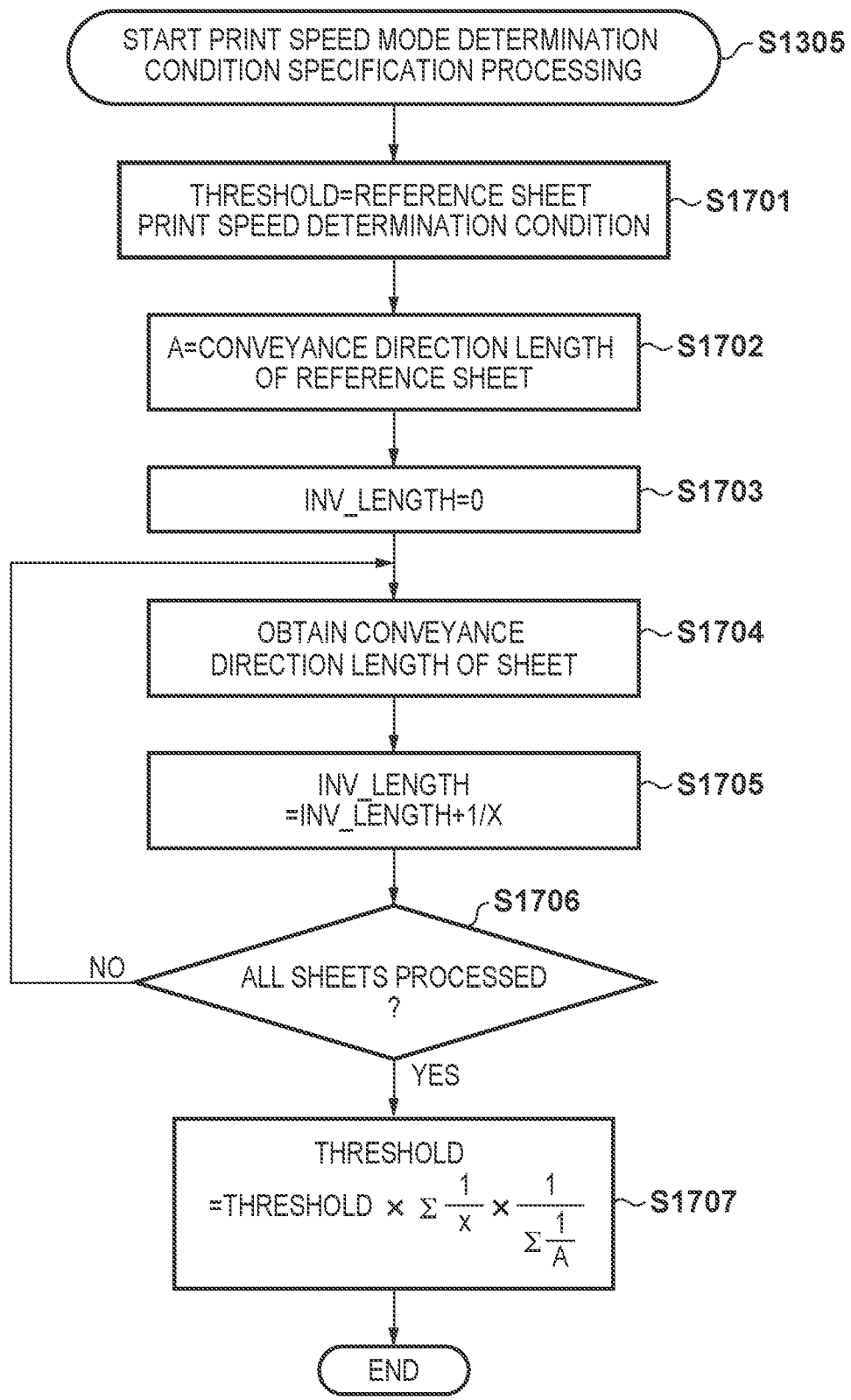
FIG. 17 is a flowchart for explaining another example of a method of determining a print speed mode.

FIG. 17 illustrates a flowchart of print speed mode determination condition specification processing according to the present embodiment for S1305 (see FIG. 13A) as part of a method of determining whether to switch print speed modes for the print job in the above-described case. In summary, an arbitrary sheet size is set as a reference sheet size, and the print speed mode determination condition for when a plurality of sheet sizes is mixed is specified based on an inverse ratio (ratio of inverses) of conveyance direction lengths of the reference sheet size and a sheet to be actually printed.

In S1701, the DFE 103 substitutes a value indicating the print speed determination condition of the reference sheet size for the above-described parameter THRESHOLD. For example, the parameter THRESHOLD indicating the print speed mode determination condition of the reference sheet size in a case of A4 size (small size) is 150.

In S1702, a conveyance direction length A of the reference sheet size is obtained. For example, for an A4 size, the conveyance direction length A of the reference sheet size is 210 mm.

In S1703, a sum of the inverse ratio is set as a parameter INV_LENGTH for the conveyance direction length of each sheet in the print job, and the parameter INV_LENGTH is initialized (INV_LENGTH=0). S1704 to S1705 after S1703 indicate processing contents for each sheet in the job data.

In S1704, a conveyance direction length X is obtained for the sheet size of the sheet to be processed, and in S1705, an inverse ratio of the length X is added to the parameter INV_LENGTH (INV_LENGTH=INV_LENGTH+1/X).

In S1706, it is determined whether all of the print target sheets of the job data have been processed. When there is an unprocessed page (when it is determined NO in S1706), the processing contents of the above-described S1704 and S1705 is repeated in order for each of the unprocessed pages.

When all of the print target sheets of the job data have been processed (when YES is determined in S1706), in S1707, the DFE 103 performs calculation processing for the parameter THRESHOLD. The arithmetic equation thereof can be expressed as:

$$\text{INV\_LENGTH} = \text{INV\_LENGTH} \times \Sigma 1/X \times (\Sigma 1/A)^{-1}$$

That is, the parameter INV_LENGTH is calculated based on a ratio of the sum $\Sigma 1/A$ of the inverse ratio of the conveyance direction length A of the reference sheet size and the sum $\Sigma 1/X$ of the inverse ratio of the conveyance direction length X of the sheet size of the sheet to be processed.

As described above, when a plurality of sheet sizes is mixed in the print job data, the print speed mode determination condition may be specified as the parameter THRESHOLD.

In the example of FIG. 16A, when the reference sheet size is an A4 size and the conveyance direction length is A, the conveyance direction length of an A3 size is 2A. Since the parameter THRESHOLD indicating the print speed mode determination condition of the reference sheet size is 150, $$\text{THRESHOLD} =$$
$$150 \times (50 \times 1/A + 50 \times 1/2A + 50 \times 1/A + 50 \times 1/2A) \times (A/200) = 112.5.$$

The above calculation result (THRESHOLD=112.5) is larger than the parameter COUNT_MAX, 100, which indicates the maximum number of consecutive sheets that can be printed in high-speed printing mode. Therefore, in S1329, it is determined that the productivity is increased by printing at the first print speed (high-speed printing mode) (see FIG. 16A).

As described in the above embodiment, there are cases where job data that is set or configured such that processing for switching print speed modes may occur due to a plurality of sheet types to be used being mixed in a print job is processed. When performing print processing for such job data, a decrease in productivity due to switching of print speed modes and an increase in productivity printing in high-speed printing mode are compared and evaluated based on print job conditions. According to the embodiments, by selecting an appropriate print speed mode based on that evaluation result and performing printing, it is possible to appropriately maintain printing productivity.

Other Embodiments

In the above description, to facilitate understanding, each element has been illustrated by a name related to the functionality thereof; however, each element is not limited to include the contents described in the embodiments as their main function and may supplementarily include the contents. Therefore, each element is not strictly limited to its expression, and its expression can be replaced by a similar expression. For example, the expression "apparatus" may be replaced with "unit", "component, piece", "member", "structure", "assembly", or the like or may be omitted.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-125850, filed on Aug. 5, 2022, which is hereby incorporated by reference herein in its entirety.

What is claimed is:

1. A printing apparatus operable to perform printing based on print job data, the printing apparatus comprising:
a determination unit configured to determine a print speed for when the printing is performed;
a switching unit configured to switch print speeds during the printing; and
an analysis unit configured to analyze the print job data,
wherein the analysis unit analyzes whether sheets that are print targets according to the print job data include a first sheet type and a second sheet type, the first sheet type being printable at a first print speed and at a second print speed slower than the first print speed, and the second sheet type being printable at the second print speed and not being printable at the first print speed, and
wherein, in a case where the analysis result of the analysis unit indicates that the print targets according to the print job data include both the first sheet type and the second sheet type, the switching unit switches print speeds during the printing based on a productivity of printing for each sheet type when printing is performed for the sheets and a productivity of printing for a case where print speeds are switched by the switching unit, and
in a case where a large number of sheets than can be printed at the first print speed is equal to or more than a reference, the switching unit switches the print speeds from the second print speed to the first print speed.

2. The printing apparatus according to claim 1, further comprising:
an evaluation unit configured to evaluate a productivity of printing,
wherein the evaluation unit performs the evaluation based on a degree of an increase in a productivity of printing for a case where printing is performed at the first print speed and a degree of a decrease in the productivity of printing for a case where print speeds are switched by the switching unit, and
wherein the switching unit switches print speeds during the printing based on a result of the evaluation by the evaluation unit.

3. The printing apparatus according to claim 2,
wherein the first sheet type and the second sheet type are part of a plurality of sheet types, and
wherein the plurality of sheet types further includes a sheet type for single-sided printing and a sheet type for double-sided printing.

4. The printing apparatus according to claim 2,
wherein the first sheet type and the second sheet type are part of a plurality of sheet types, and
wherein the plurality of sheet types further includes sheet types whose sheet sizes are different from each other.

5. A non-transitory computer-readable storage medium storing a program, the program configured to cause a computer to function as each unit of the apparatus according to claim 1.

6. The printing apparatus according to claim 1,
wherein a productivity of printing increases corresponding to a time until completion of printing decreasing.

7. A method of controlling a printing apparatus operable to perform printing based on print job data, the method comprising:
analyzing the print job data, including analyzing whether sheets that are print targets according to the print job data include a first sheet type and a second sheet type, the first sheet type being printable at a first print speed and at a second print speed slower than the first print speed, and the second sheet type being printable at the second print speed and not being printable at the first print speed;
determining a print speed for each sheet to be printed based on sheet type; and
switching print speeds during the printing, in a case where the analysis result indicates that the print targets according to the print job data include both the first sheet type and the second sheet type, based on a productivity of printing for each sheet type when printing is performed for the sheets and a productivity of printing for a case where print speeds are switched, wherein
in a case where a large number of sheets than can be printed at the first print speed is equal to or more than a reference, the print speeds are switched from the second print speed to the first print speed.

8. The method according to claim 7, further comprising:
evaluating a productivity of printing,
wherein the evaluating is performed based on a degree of an increase in a productivity of printing for a case where printing is performed at the first print speed and a degree of a decrease in the productivity of printing for a case where print speeds are switched, and
wherein print speeds are switched during the printing based on a result of the evaluating.

9. The method according to claim 8,
wherein the first sheet type and the second sheet type are part of a plurality of sheet types, and
wherein the plurality of sheet types further includes a sheet type for single-sided printing and a sheet type for double-sided printing.

10. The method according to claim 8,
wherein the first sheet type and the second sheet type are part of a plurality of sheet types, and
wherein the plurality of sheet types further includes sheet types whose sheet sizes are different from each other.

* * * * *